INVENTORS.
FRED H. OSBORNE,
CHARLES J. HULL.
BY
Lockwood, Goldsmith & Galt,
ATTORNEYS.

June 23, 1942.  F. H. OSBORNE ET AL  2,287,560
AUTOMATIC PHONOGRAPH
Filed April 11, 1940    28 Sheets-Sheet 6

INVENTORS.
FRED H. OSBORNE.
CHARLES J. HULL.
BY
Lockwood, Goldsmith & Galt
ATTORNEYS.

June 23, 1942.  F. H. OSBORNE ET AL  2,287,560
AUTOMATIC PHONOGRAPH
Filed April 11, 1940  28 Sheets-Sheet 7

INVENTORS.
FRED H. OSBORNE.
CHARLES J. HULL.
BY
Lockwood, Goldsmith & Galt,
ATTORNEYS.

June 23, 1942.  F. H. OSBORNE ET AL  2,287,560
AUTOMATIC PHONOGRAPH
Filed April 11, 1940  28 Sheets-Sheet 8

INVENTORS.
FRED H. OSBORNE.
CHARLES J. HULL.
BY
Lockwood, Goldsmith & Galt,
ATTORNEYS.

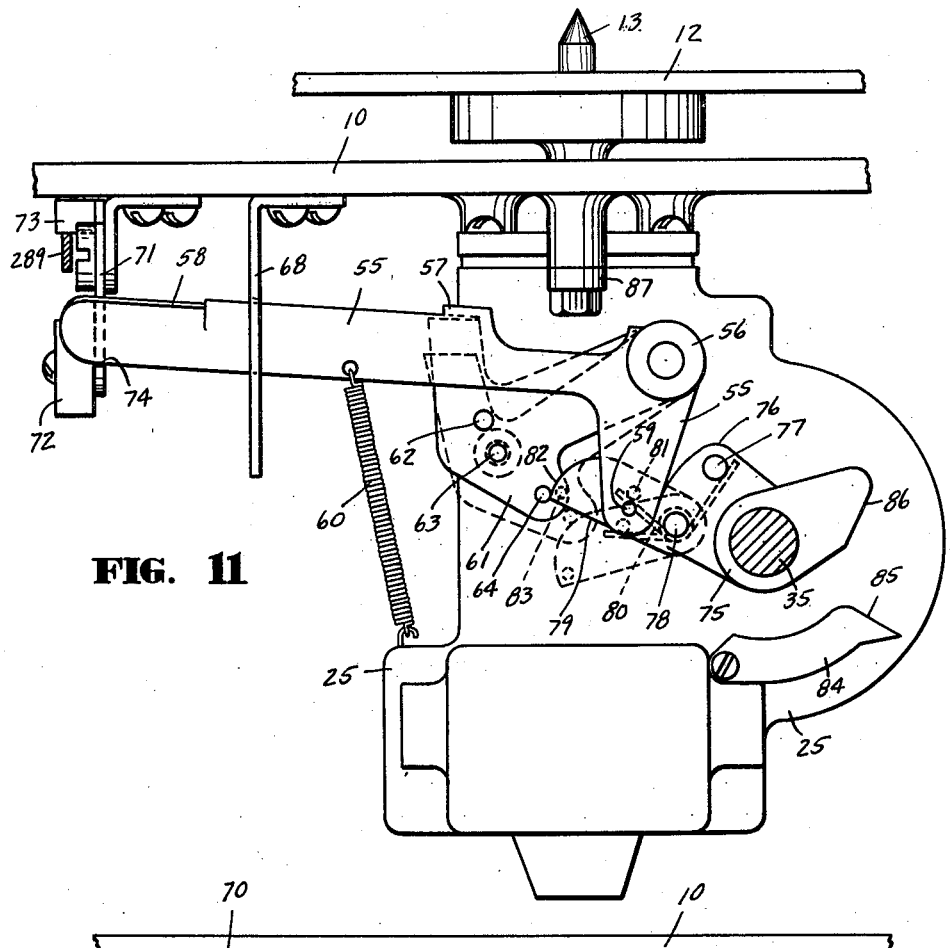
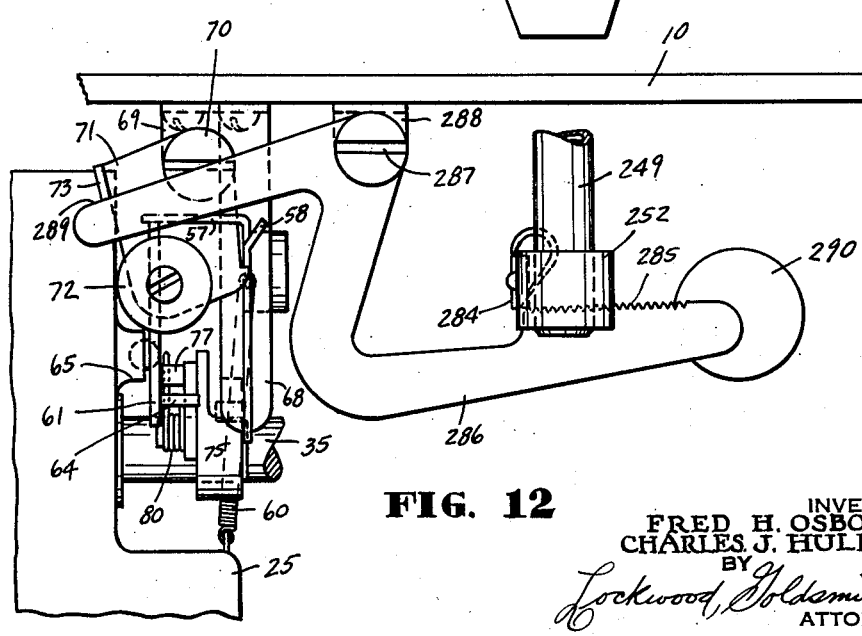

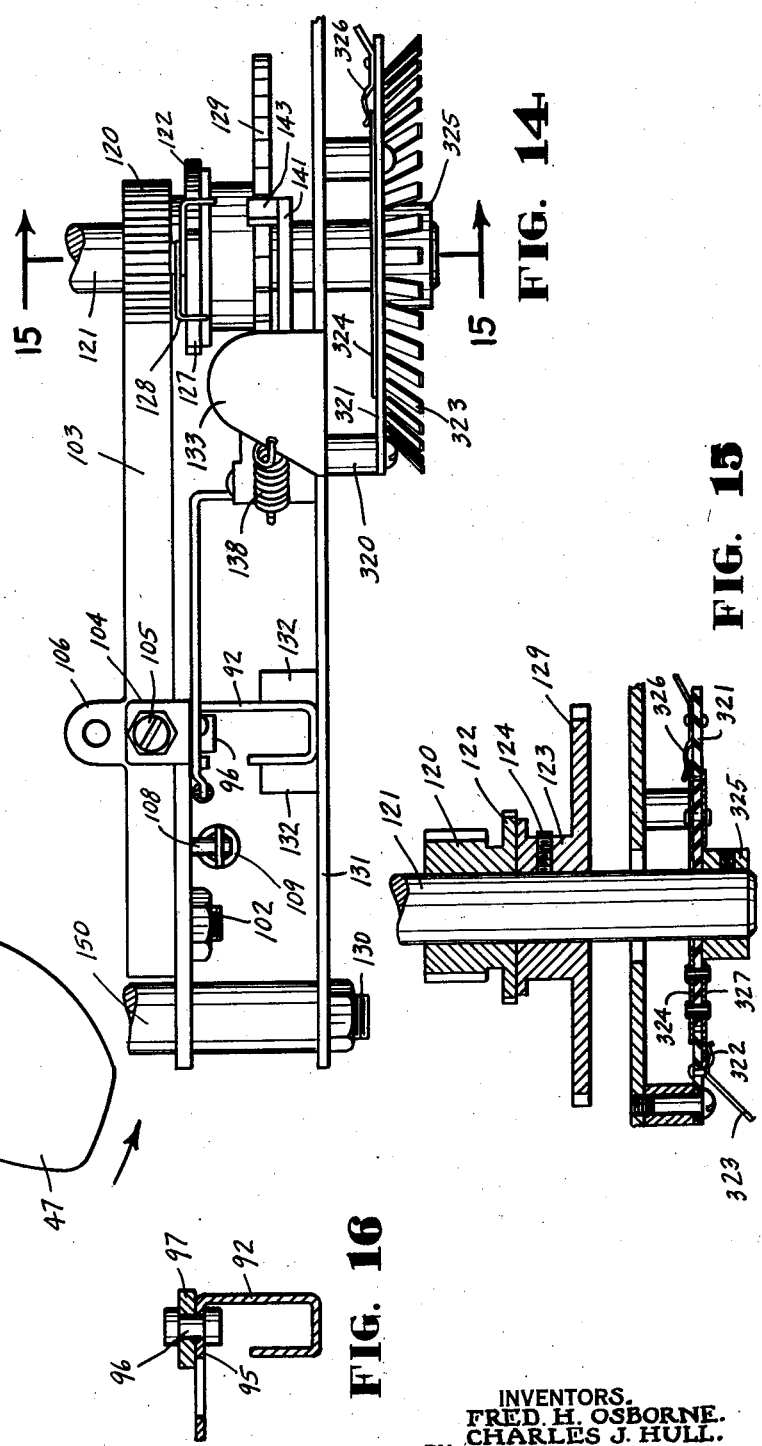

June 23, 1942. F. H. OSBORNE ET AL 2,287,560
AUTOMATIC PHONOGRAPH
Filed April 11, 1940 28 Sheets-Sheet 14

INVENTORS.
FRED H. OSBORNE.
CHARLES J. HULL.
BY
Lockwood Goldsmith & Galt
ATTORNEYS.

June 23, 1942.   F. H. OSBORNE ET AL   2,287,560
AUTOMATIC PHONOGRAPH
Filed April 11, 1940   28 Sheets-Sheet 18

INVENTORS.
FRED H. OSBORNE.
CHARLES J. HULL.
BY
Lockwood, Goldsmith & Galt
ATTORNEYS.

INVENTORS.
FRED H. OSBORNE.
CHARLES J. HULL.
BY
Lockwood, Goldsmith & Galt
ATTORNEYS.

June 23, 1942.  F. H. OSBORNE ET AL  2,287,560
AUTOMATIC PHONOGRAPH
Filed April 11, 1940    28 Sheets-Sheet 20

INVENTORS.
FRED H. OSBORNE.
CHARLES J. HULL.
BY
Lockwood, Goldsmith & Galt
ATTORNEYS INVENTORS.
FRED H. OSBORNE.
CHARLES J. HULL.
BY
Lockwood, Goldsmith & Galt
ATTORNEYS.

June 23, 1942.  F. H. OSBORNE ET AL  2,287,560
AUTOMATIC PHONOGRAPH
Filed April 11, 1940   28 Sheets-Sheet 22
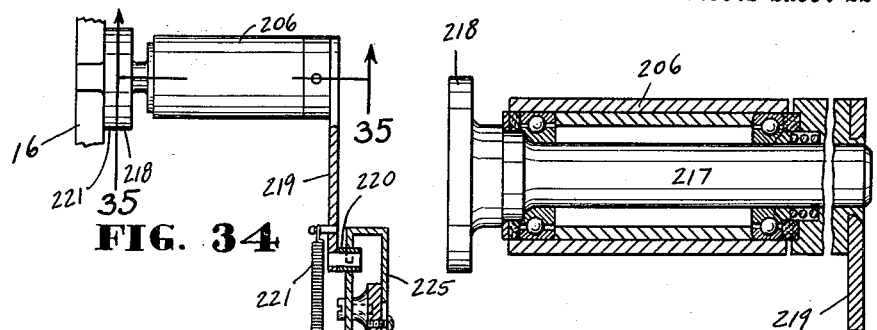
FIG. 34
FIG. 35
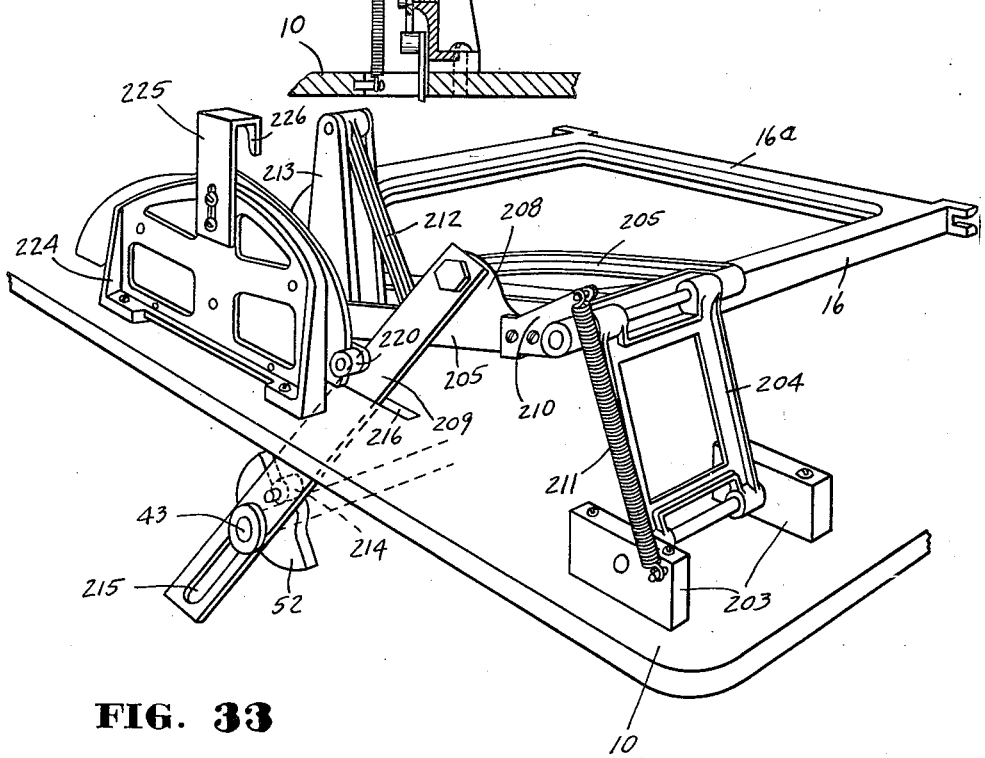
FIG. 33
INVENTORS.
FRED H. OSBORNE.
CHARLES J. HULL.
BY
Lockwood, Goldsmith & Galt
ATTORNEYS.

June 23, 1942.  F. H. OSBORNE ET AL  2,287,560
AUTOMATIC PHONOGRAPH
Filed April 11, 1940  28 Sheets-Sheet 23

INVENTORS.
FRED H. OSBORNE.
CHARLES J. HULL.
BY
Lockwood, Goldsmith & Galt
ATTORNEYS.

June 23, 1942.　　F. H. OSBORNE ET AL　　2,287,560
AUTOMATIC PHONOGRAPH
Filed April 11, 1940　　28 Sheets-Sheet 24

INVENTORS.
FRED H. OSBORNE.
CHARLES J. HULL.
BY Lockwood, Goldsmith & Galt,
ATTORNEYS.

June 23, 1942.  F. H. OSBORNE ET AL  2,287,560
AUTOMATIC PHONOGRAPH
Filed April 11, 1940  28 Sheets-Sheet 25

INVENTORS.
FRED H. OSBORNE.
CHARLES J. HULL.
BY
Lockwood, Goldsmith & Galt,
ATTORNEYS.

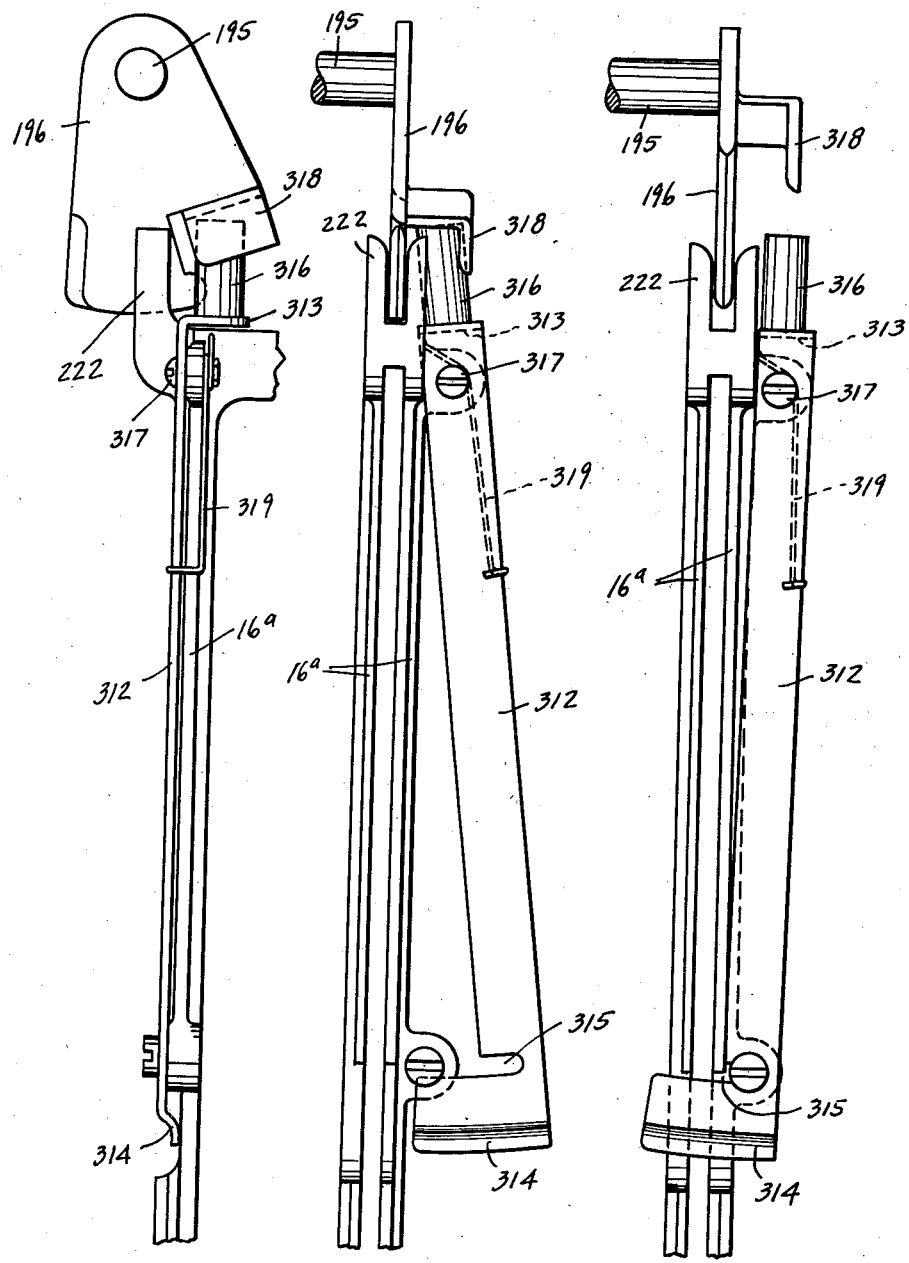

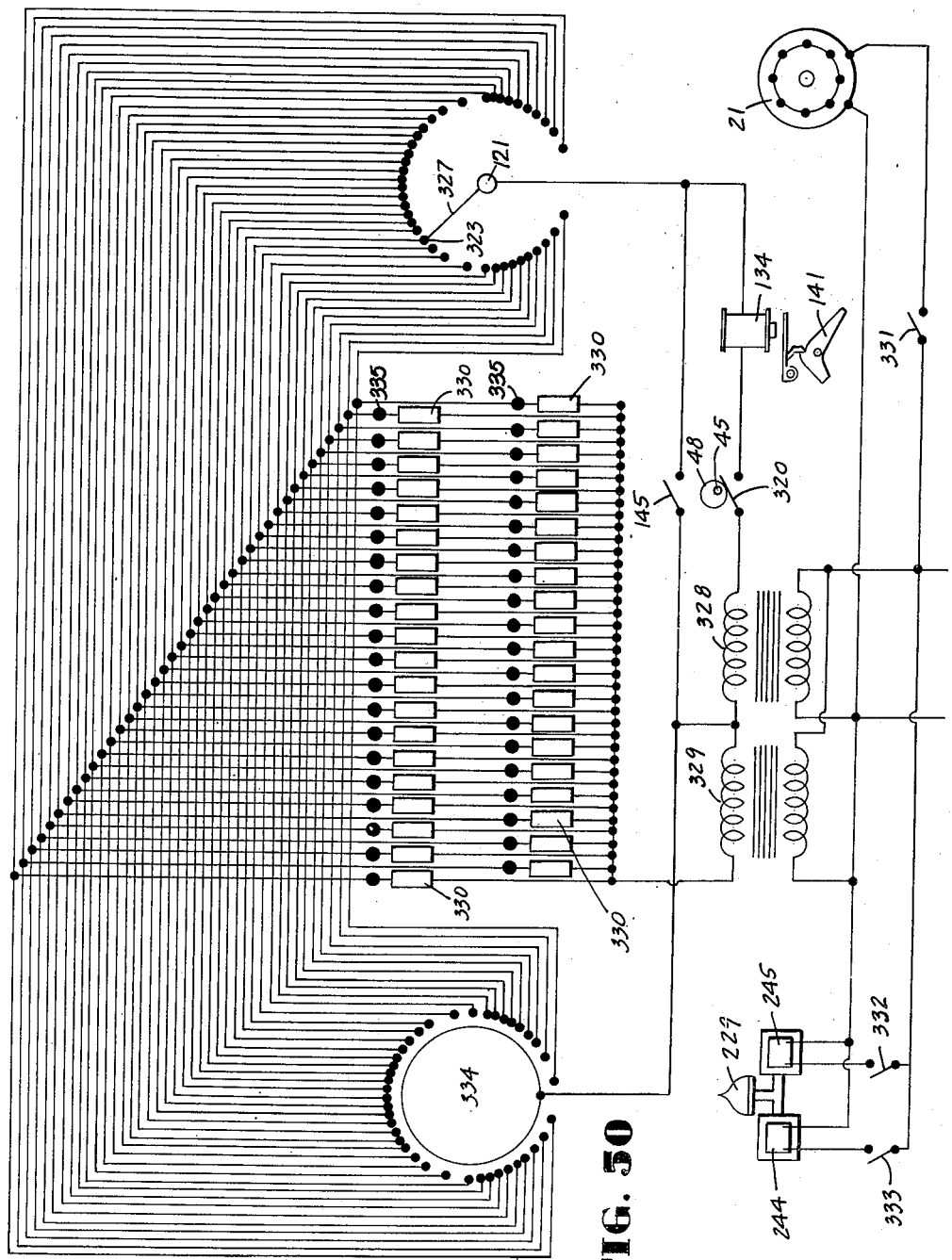

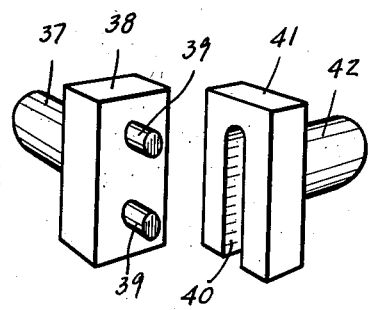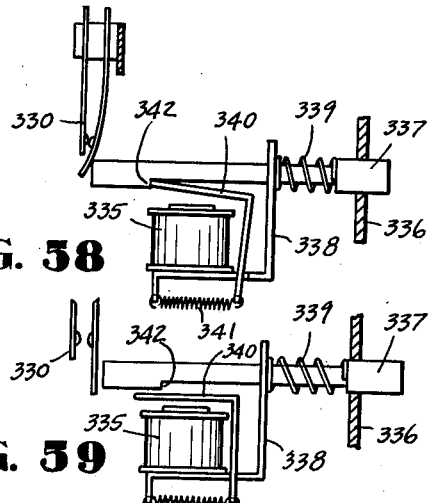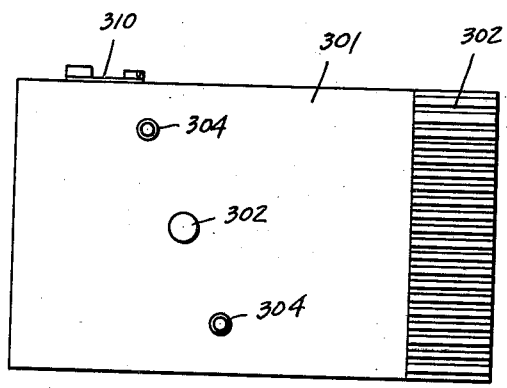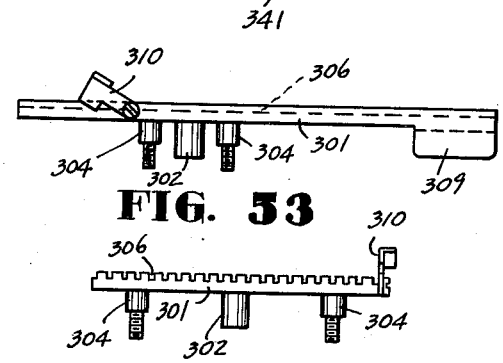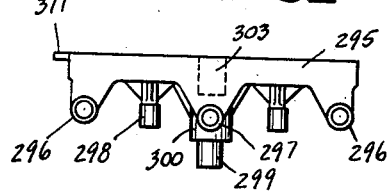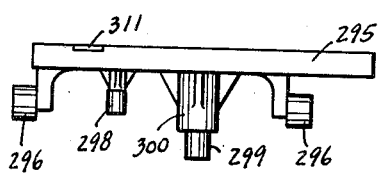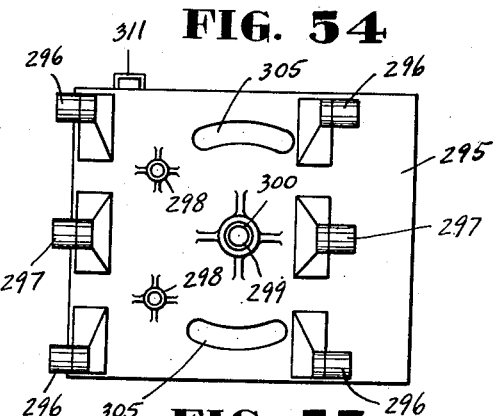

Patented June 23, 1942

2,287,560

UNITED STATES PATENT OFFICE 2,287,560

AUTOMATIC PHONOGRAPH

Fred H. Osborne, Snyder, and Charles J. Hull, North Tonawanda, N. Y., assignors to The Rudolph Wurlitzer Company, Cincinnati, Ohio, a corporation Application April 11, 1940, Serial No. 329,070

28 Claims. (Cl. 274—10)

This invention relates to an automatic phonograph, and particularly the record changing mechanism therefor.

The object of the invention is to provide an effective record changing mechanism which will function automatically to present a series of records for play in sequence, and wherein all the records sequentially presented will be played on one side and then played on the opposite side, without any manual operation other than closing the master switch to the driving motor; and also, such a machine wherein the records may be selected and a selected side of the selected record presented for play by remote control or otherwise. Thus, the phonograph will operate to reproduce a selected side of a selected record, or, if no selection is made, it will automatically play the records in sequence on one side and then the other.

One feature of the invention resides in the mounting, operation and control of the record receiving carrier or cage wherein a selected record may be transferred thereto when in its vertical position, after which the carrier will swing to a horizontal position and lower the record onto the turntable, the direction in which the carrier is swung from the vertical to the horizontal position being determined by a cam which is shiftable through an electric selector control.

Another feature of the invention resides in the construction of the record carrier wherein it will freely receive a record which may be rolled therein from the magazine when in its vertical position and will retain the record while it turns to a horizontal position to place it on the turntable; and after placement on the turntable, the record may be freely rotated without contact with the carrier.

Another feature of the invention resides in automatic means for locking the carrier and magazine in record transfer alignment during the record transferring operation, while releasing them respectively after the transfer of a record from one to the other to permit the carrier to place the record on the turntable, or the magazine to move into a new position to present another record to the carrier. Through this arrangement the proper path of movement between the magazine and carrier may always be assured.

A further feature of the invention resides in the provision of means on the carrier for locking or retaining the record therein so that there will be no danger of it sliding or rolling from the carrier while it is being moved to record placing position with respect to the turntable, including its movement from a vertical record receiving position to a horizontal record depositing position with the selected side thereof uppermost. This is accomplished by providing a pivoted arm held in closed or locking position, but which will be mechanically moved to open position for permitting record transfer when the carrier is brought into and locked in alignment with the magazine.

Still a further feature of the invention resides in the provision and arrangement of the record transfer arms, one of which will move through a record pocket in the magazine to engage a selected record therein and roll it into the carrier for placement on the turntable, and another transfer arm which will correspondingly move through the carrier to engage the edge of the record therein and roll it back into its proper position in the magazine after reproduction. Said arms are alternately and sequentially moved in timed relation to effect the transfer when the magazine and carrier are locked in record transfer position, the played record being first moved from the carrier to its position in the magazine, after which the magazine is operated to present a new record, whereupon the other arm is operated to move the new record into the carrier.

Another feature of the invention resides in the selective or sequential positioning of the magazine with respect to the record carrier and transfer arms. This arrangement is such that through remote electrical control, such as the operation of selector keys or push buttons, one for each side of each record, the magazine will be moved through a partial cycle of its reciprocatory movement until arrested by the selective electrical control in a position to present such selected record to the magazine. If the same side of the same record is selected, it will move through a complete cycle. If the same record is selected, but an opposite side thereof from that reproduced, it will move through a partial cycle,—to one end of its movement and back again to the same position; but the carrier will be caused to turn for presenting the opposite side of the record to the reproducer. This is accomplished by providing a rotary switch rotatable with a rotary cam which imparts linear movement to the magazine, the rotary switch having contact points connected with the corresponding selectors so as to close a circuit and operate a solenoid to arrest the movement of the magazine at the prescribed position to present the selected record. But if the selection is such that a reverse side of the record is to be reproduced, the extent of movement of the rotary cam will close a circuit operating another solenoid which will control the horizontal turning of the carrier to present the prescribed side of the record.

Another feature of the invention resides in the supporting carriage and its operation for effecting the reciprocatory or linear movement of the magazine through rotary movement of its driving cam. Furthermore, the magazine is arranged to swivel on the carriage to such position as will conveniently permit loading and unloading of records, it being unlocked from the carriage for this purpose while being locked thereto for automatic operation.

A still further feature of the invention resides in the cushioning device for retarding the lowering of the reproducer onto the record so that it will be generally brought into engagement therewith.

Other features of the invention not specifically referred to above will be noted from the following specifications and claims with the accompanying drawings.

The full nature of the invention will be understood from the accompanying drawings and the following description and claims:

Fig. 11 is the same as Fig. 9 showing the parts in clutch disengaging position;

Fig. 12 is the same as Fig. 10 showing the parts in the position indicated in Fig. 11;

Fig. 13 is a side elevation of the cam and associated parts for actuating the record magazine;

Fig. 14 is an elevation showing parts of the record selecting mechanism;

Fig. 15 is a vertical cross sectional view taken on the line 15—15 of Fig. 14 with the shaft in elevation;

Fig. 16 is a section taken on the line 16—16 of Fig. 18;

Fig. 33 is the same as Fig. 32 with the cage in lowered position;

Fig. 34 is a section taken on the line 34—34 of Fig. 32 with associated parts in elevation;

Fig. 35 is an enlarged sectional view taken on the line 35—35 of Fig. 34 with the shaft and associated parts in elevation;

Fig. 47 is a side elevation of a portion of the record receiving cage in locked position with the record retaining gate in open position;

Fig. 48 is the same as Fig. 47, showing a front elevation thereof;

Fig. 49 is the same as Fig. 48 showing the gate in closed position;

Fig. 50 is a schematic wiring diagram showing electrical circuits for controlling the record changing mechanism;

Fig. 51 is a perspective view of the flexible drive shaft coupling in disconnected relation;

Fig. 52 is a bottom plan view of the magazine base;

Fig. 53 is a side elevational view of the magazine base;

Fig. 54 is a left end elevation of the magazine base;

Fig. 55 is a left end elevation of the magazine carriage;

Fig. 56 is a front elevation of the magazine carriage;

Fig. 57 is a bottom plan view of the magazine carriage;

Fig. 58 is an elevational view of a selector switch and actuator in actuated position; and Fig. 59 is the same as Fig. 58 showing the switch and actuator in released position.

Figure 1:
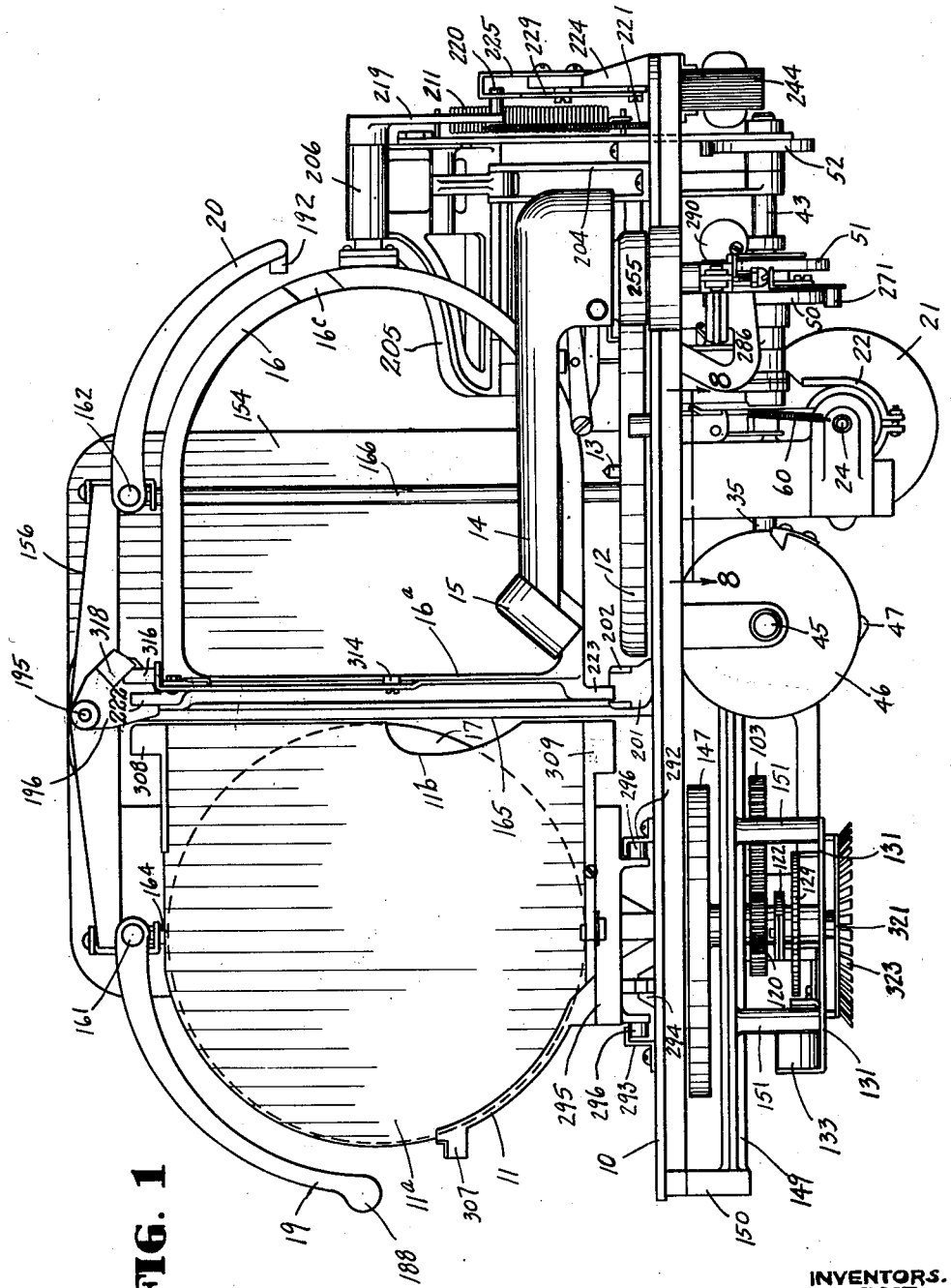
Fig. 1 is a front elevation with the record removable from the cage.

As illustrated in the attached drawings, the record changer is adapted to support a plurality of records of one size upon edge in a reciprocating magazine, the magazine being selectively positioned to present a selected record to the transfer carrier which is herein disclosed as a substantially semi-circular cage. The positioning of the record magazine is accomplished by electrically actuated selective means to permit the operator to remotely control the selection, as will be hereinafter described. In fact, the operator may simultaneously select a number of records to be played in their selected order through the automatic positioning of the magazine. However, if the operator makes no selection, or if the machine continues to be operated beyond the number of selections made, it will then function to sequentially position the records.

To present a record for play, said record is positioned by the magazine in alignment with a cage into which the record is transferred, the cage being so arranged as to receive the record, turn it from a vertical to a horizontal position with one or the other side thereof uppermost, and lower it into playing position onto the turntable. The movement of the cage to present the proper side of the record uppermost for play is likewise determined by the record selecting mechanism or its sequential operation, whereby either side of a record may be selected and played or if sequentially operated, first one side and then the other side will be played.

The mechanism comprises a supporting base 10 carrying a transversely movable or reciprocating record magazine 11. To one side thereof there is provided the usual turntable 12 having a centering pin 13. Pivotally supported upon the base in the usual manner and associated with the turntable there is a tone arm 14 carrying a reproducer 15. Centrally positioned over the turntable there is a record receiving cage 16 into which the record 17 is rolled by a pivoted downwardly and inwardly swinging record transfer arm 19. Upon the record being so transferred by the arm 19 to the cage 16, said cage is rotated to a horizontal position and lowered into the plane of the turntable for depositing the record thereon in playing position.

In turning to its horizontal position with the record, the cage may swing in one direction or the other to present a predetermined side of the record uppermost for reproduction. Upon completion of the play, the cage receives the record from the turntable and turns it to its vertical position, whereupon a pivoted downwardly extending arm 20 rolls the record from the cage back into its original position in the magazine.

*Main drive*

Figure 6:
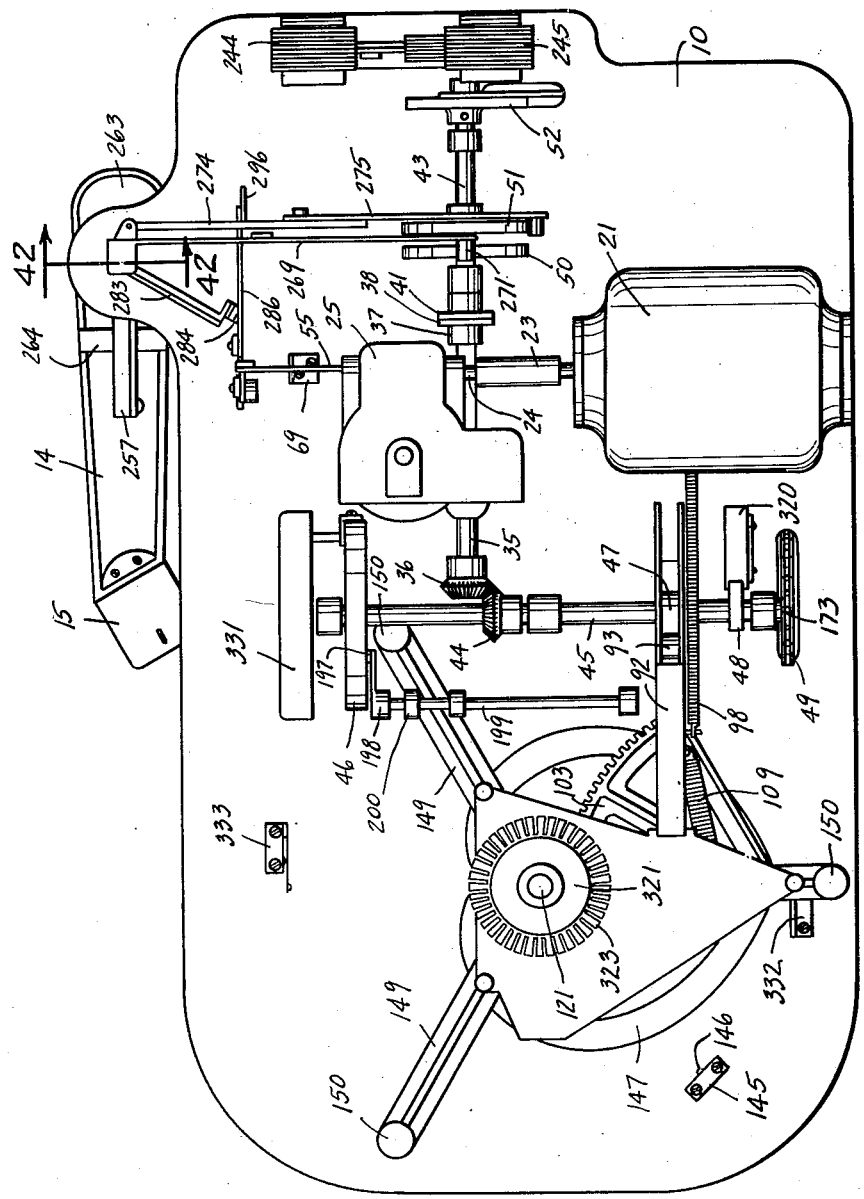
Fig. 6 is the same as Fig. 5 showing a bottom plan view.
Figure 7:
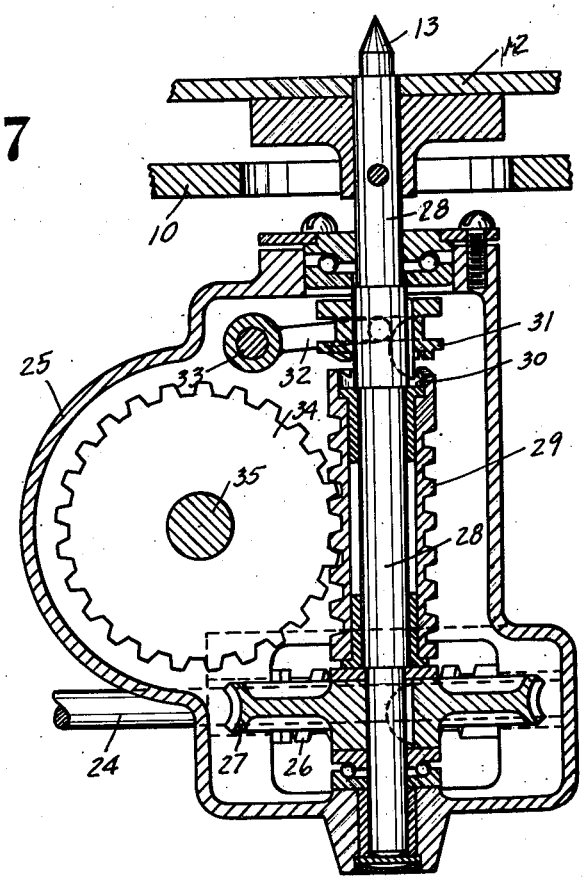
Fig. 7 is a vertical cross sectional view of the main drive and clutch.

Both the turntable and the record changing mechanism is driven by an electric motor 21 suspended from the hangers 22 depending from the base 10. The motor 21 is connected by a flexible coupling 23 to a worm shaft 24 supported by the main drive housing 25 (Fig. 6). Within said housing and rigidly attached to shaft 24 there is a worm 26 (Figs. 7 and 8) meshing with a worm gear 27 so that said worm and gear have a velocity ratio such that the latter revolves at the usual turntable speed of 78 R. P. M. Gear 27 is keyed to a spindle 28 extending upwardly through the base plate 10 for driving the turntable 12.

Said spindle 28 carries thereon a freely rotatable worm 29 in the upper end of which there is provided a driven member 30 of a sliding clutch 31, which clutch is slidably keyed to said spindle so that when out of engagement with member 30 there will be no driving connection between the spindle and the worm 29, but upon the clutch being lowered into engagement with member 30, said worm 29 will be driven by the spindle. Said clutch 31 is grooved to receive a yoke 32 for moving it in and out of clutching relation with said worm. Extending into said housing 25 there is a rock shaft 33 which is pinned to the yoke 32 for actuating it.

Through cam actuated means hereinafter described and upon the completion of the record, rock shaft 33 is oscillated to cause engagement of the clutch for driving the worm 29. Said worm 29 drives a worm gear 34 when the clutch is effective. Worm gear 34 is keyed to a shaft 35 supported within the housing 25. The velocity ratio of said gear and worm is such that the shaft makes one complete revolution in approximately twenty seconds.

The shaft 35 (Fig. 6) extends from both sides of the housing 25 and on one end drives a beveled gear 36. The other half of the shaft is keyed in a sleeve 37 of a coupling block 38, as shown in Fig. 51. Said block is provided with a pair of dowel pins 39 movable in a recess 40 of a block 41 which in turn is provided with a sleeve 42 for receiving a shaft 43.

The purpose of this coupling is twofold. It permits slight misalignment of the shafts 35 and 43 while transmitting power therebetween. It also permits said shafts to be readily disconnected for any purpose.

The gear 36 meshes with and drives a gear 44 (Fig. 6) keyed to a transverse cam shaft 45 having secured thereto at suitable locations a lower lock cam 46, a selector cam 47, a switch actuating cam 48, and a sprocket wheel 49. Shaft 43 has secured thereto a tone arm lift cam 50, a tone arm swing cam 51, and a lift cam 52 for elevating the record receiving cage 16.

*Cam shaft controls*

The shaft 33 (Fig. 8) has secured to its exposed end a primary clutch arm 55 by means of a hub 56 which is staked to said lever and revolves freely on said shaft. Arm 55 has the general shape of the letter L with the hub 56 at its angle. Approximately at the middle of its longer portion there is provided an ear 57 bent at right angles to its breadth. Upon the upper edge of the extremity of its longer portion there is provided a flange 58 bent at an angle to approximately 45 degrees to the side opposite the ear 57.

Near the extremity of the shorter portion of the arm 55 (Fig. 9), there is provided thereon a pin 59 projecting from the same side as the ear 57. Arm 55 is urged downwardly by a contractile spring 60 connected thereto at one end and at the other to the ear of housing 25.

Secured to shaft 33 between hub 56 and the housing 25 there is a secondary clutch arm generally designated as 61. Its general shape is that of the letter T. Said arm 61 is provided with a pair of holes 62 and 63, their centers being on an arc swung about the axis of shaft 33. They are so spaced apart as to permit movement necessary to move the clutch 31 into and out of engagement. Projecting from arm 61 distant from the housing 25 there is provided a pin 64.

Figure 8:
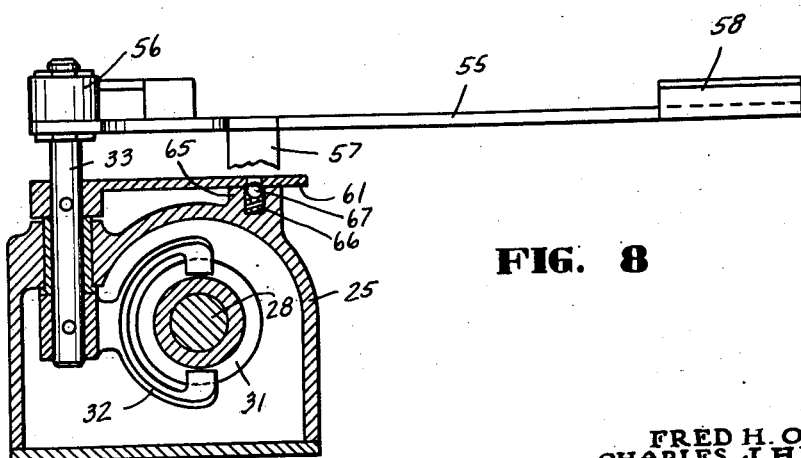
Fig. 8 is a horizontal cross sectional view taken on the line 8—8 of Fig. 1.
Figure 9:
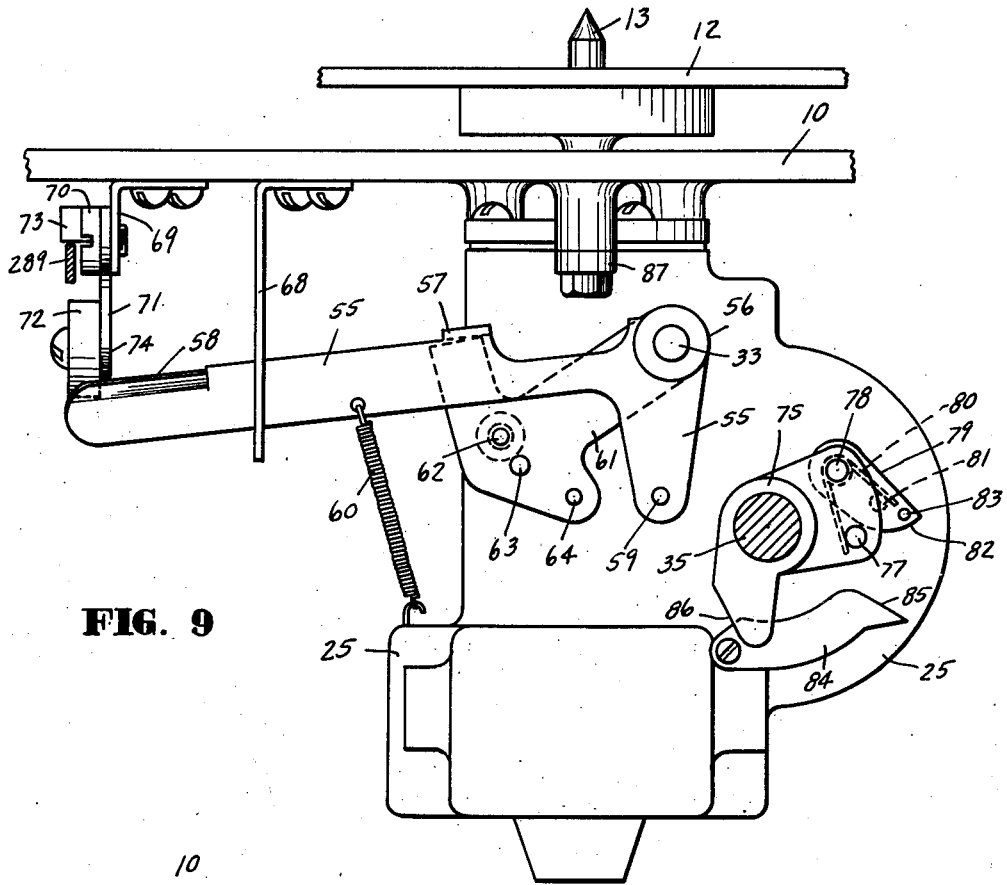
Fig. 9 is a side elevation of the gear housing of the main drive showing the clutch operating mechanism in position for clutch engagement.
Figure 10:
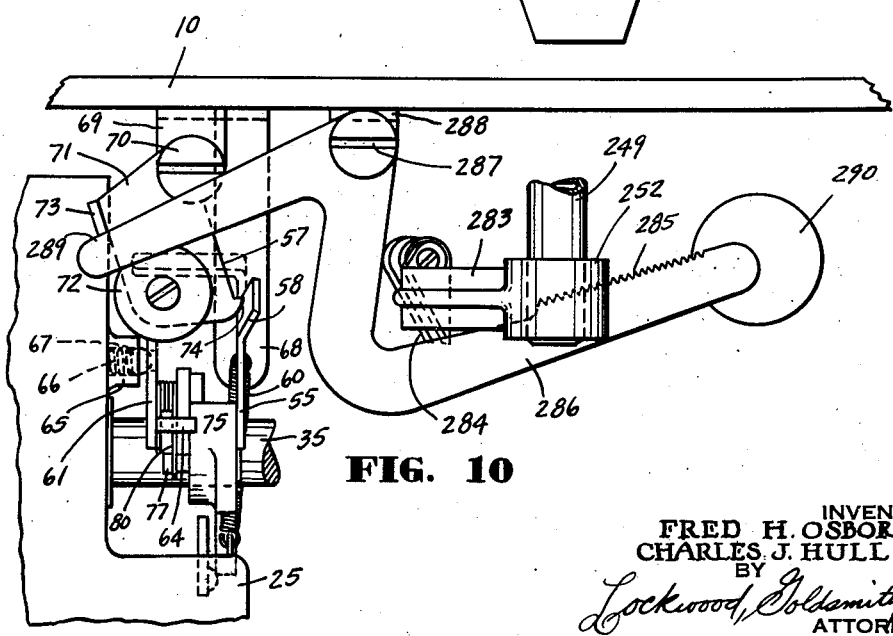
Fig. 10 is a partial rear elevation of the main drive housing as shown in Fig. 9, with the parts in the same relative position.

As shown in Fig. 10, there is provided a hollow cylindrical boss 65 which projects from the face of the housing 25, having a plain end adjacent arm 61. Within the cavity of said boss there is provided a spring 66 urging a ball 67 into engagement with the holes 62, 63, respectively. By dislodgment in one or the other of said holes, ball 67 checks the arcuate movement of the arm 61 (Figs. 8, 9 and 10).

Said arm 55 is guided in the plane of its movement by a slotted guide 68 (Fig. 9), so as to rise and fall relative thereto. Said guide is secured to the base plate 10 so as to depend therefrom. Also depending from the base plate there is provided a bracket 69 threaded to receive a shouldered screw 70. Pivoted on said screw there is provided a latch 71 of general rectangular form with a pivotal mounting at one corner. At the diagonally opposite lower corner there is attached thereto a weight 72, and struck from the remaining upper corner there is an ear 73. At the lower corner and diagonally opposite the said ear, there is provided a hook 74 projecting beyond the edge of said latch 71. Said hook 74 is shaped to normally prevent downward movement of arm 55. For this purpose it lies in the arcuate path of said arm and is urged into position by the weight 72.

Shaft 35 is provided with a restoring apparatus comprising a casting 75 (Fig. 11) having two radially projecting arms at opposite ends thereof and separated by a suitable angular distance. The casting 75 lies entirely between the housing 25 and the plane of movement of the shorter portion of arm 55. One of said arms 76 nearest the housing 25 has a free end broadened to receive a stationary pin 77 which projects from its outer face and with its axis lying parallel to that of shaft 35. Spaced from pin 77 by the breadth of said arm there is a shoulder rivet 78 upon which is pivoted a hammer 79 (Figs. 9 and 11). Said hammer lies against the outer face of the arm 76. About the rivet 78 there is wrapped a torsion spring 80. One end of said spring bears upon pin 77, while the other end bears upon a pin 81 projecting a short distance from the outer face of the hammer 79 at approximately the mid portion thereof.

By this means, said hammer is caused to move rapidly through a segment of a circle when the energy stored by separating the ends of said spring, is released so as to permit them to approach each other. The free end 82 of said hammer is quadrant shaped for the purpose hereinafter explained. The plane of the path of said hammer intersects the path of movement of pin 64 on the arm 61. Near the intersection of the quadrant and straight edges of the hammer 79 and from the face thereof nearest the housing 25 projects a pin 83 whose axis lies in the plane of a trip 84 secured rigidly to the housing 25. Said trip has its uppermost edge formed into an ogee, the greater length of which is a segment of a circumference about shaft 35 and lying within the path of pin 83 when the latter is in its negative position, as shown in Fig. 9. The reverse curve terminates in a straight slope indicated at 85 which continues to a point outside of the circumferential path of said pin 83.

At the opposite end of casting 75 there projects an arm portion 86 (Fig. 11) having its end profiled into an edge which is inclined to the radii and terminating in a semi-circular or rounded head. Said inclined edge travels in a plane intersecting the axis of the pin 59. The entire assembly consisting of the main drive housing 25 and its attached parts is suspended from the base plate 10 by cap screws and lugs 87.

Operation of controls

When the latching hook 74 of the catch 71 releases the arm 55 (by means to be hereinafter disclosed), spring 60 collapses, drawing said arm downwardly. The ear 57 thereupon will press downwardly upon the secondary clutch arm 61, moving it downwardly until the ball 67 engages the hole 62, as shown in Fig. 9. This movement of arm 61 will turn the shaft 33 in a counter-clockwise direction, as shown in Figs. 10 and 11. This causes the clutch yoke 32 (Fig. 8) to press the clutch 31 into driving engagement with the worm 29. Thereupon worm 29 will be rotated by the spindle 28 for driving the worm gear 34 (Fig. 7), which in turn drives the bevel gear 36 and the shaft 43 through the flexible coupling. Also, the shaft 45 is driven through the meshing of the bevel gears 36 and 44. Thus, all the cam shafts for operating the record changing mechanism are thereby set into motion (Fig. 6).

As shaft 35 progresses in its rotation, the inclined edge 86 of one of the arms of the casting 75 (Fig. 11) encounters the pin 59, pushing it upward, thereby extending spring 60 and reengaging the lower edge of the arm 55 with the latching hook 71, 74. Thus, the mechanism is relatched from the position shown in Fig. 9 to that shown in Fig. 11. Meanwhile the pin 83 at the end of the hammer 79 has encountered the reverse curve and inclined edge 85 of the trip 84. Said hammer 79 is thereby retarded, pulling the pins 77 and 81 apart, spreading the ends of the torsion spring 80 to store up energy therein. When the pin 83 reaches the left end of trip 84, as seen in Figs. 9 and 11, the energy stored in the spring causes said pins to approach one another, violently moving hammer 79 to the position shown by dotted lines in Fig. 11. Here the quadrant end 82 of the hammer encounters pin 64 projecting from the arm 61, striking it a smart blow to both drive it and cam it. The effect thereof is to move said arm upwardly from its dotted line position in Fig. 11 to its full line position.

The full line position of said hammer shows that its end just clears pin 64. The continued pressure of the spring 80 carries the hammer 79 onward to stop against pin 77, as shown in Fig. 9. As the arm 61 moves upward, the ball 67 enters the hole in the secondary clutch arm 61 (Figs. 8, 10), thereby locking said arm in its upward position with its upper cross member immediately beneath the ear 57. The shaft 33 is rocked by said arm 61 to the position shown in Fig. 7, wherein the clutch 31 is disengaged. Thus, further movement of the worm 29 is discontinued and the record changing mechanism comes to rest. From the foregoing it will be observed that shaft 35 will make only a single revolution for each cycle of operation as above described.

Thus, it will be noted that release of arm 55 will throw in the clutch 31 to drive the record changing mechanism. This occurs upon completion of the record as a result of the tripping action hereinafter described. As the shaft 35 is thereby driven through one revolution, arm 55 will be returned to its original position and at the completion of the revolution the hammer 79 will act to disconnect clutch 31 so that the record changing mechanism will come to rest. During this revolution, the cams driven by said shaft will perform their functions to change a record.

*Magazine shift*

As shown in Fig. 6, the shaft 45 is driven during the record changing cycle, said shaft having mounted thereon a cam 47. Said cam lies between the guides 90 and 91 which extend in prolongation of the sides of a thrust member 92, the cross section of which is U-shaped, as shown in Fig. 16. A revolvable follower 93 (Fig. 13) turns upon a suitable axis secured across member 92 so as to contact with the profile of said cam 47. Said cam revolves counterclockwise, as shown in Fig. 13, and as its rising face presses upon said follower 93, its tendency is to lift member 92. This is opposed by the lower part of the slot 94 through which said shaft 45 extends. Similarly, when the falling face of cam 47 is in contact with the follower 93, the tendency of the latter is to be depressed, which tendency is counteracted by the upper surface of said slot. By the reaction of their inner faces against the cam surfaces of cam 47, guides 90 and 91 serve to keep the member 92 moving in substantially the plane of said cam.

At the opposite extremity of member 92 one flange thereof is made of greater breadth than the other for a prescribed distance, and the upper moiety of that breadth is turned so that it lies parallel to the bottom of the U-shaped section. This forms an ear 95 through which is passed a rivet 96 to act as a pivot for transmitting the motion of cam 47 and thrust member 92 to a segment gear actuator 97, as shown in Figs. 3, 14 and 17 to 22, inclusive.

The follower 93 is retained in contact with cam 47 and thrust member 92 by a contractile spring 98, shown in Figs. 2, 6, 17 and 18. Said spring is anchored at one end to a bracket 99 depending from the base plate 10, and at the opposite end to a rivet 100 which protrudes from member 92.

The segment gear actuator 97 is provided in its end with an arcuate slot 101 (Fig. 18), and, adjacent thereto, a circular perforation through which a rivet 102 passes. At the corner of its free end which coincides with the leading edge of segment gear 103, actuator 97 has an upturned lug 104 with its greater faces parallel to the longer axis of said actuator, and its middle perforated and threaded substantially at right angles to said axis for the reception of an adjusting screw 105, the point of which bears against a similar upturned lug 106 on the adjacent edge of said segment gear 103.

Figure 19:
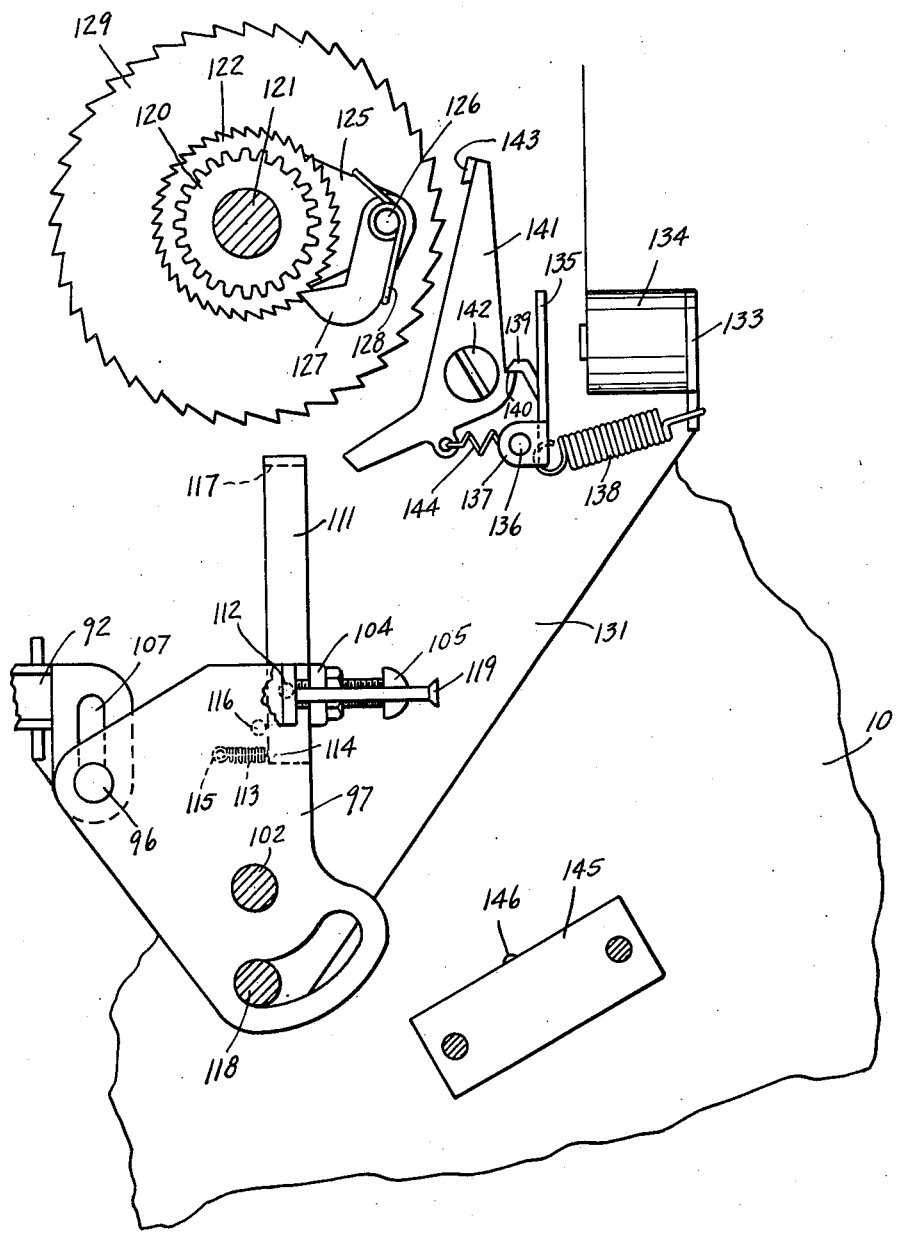
Fig. 19 is a plan view of certain of the parts shown in Figs. 17 and 18 at rest.
Figure 20:
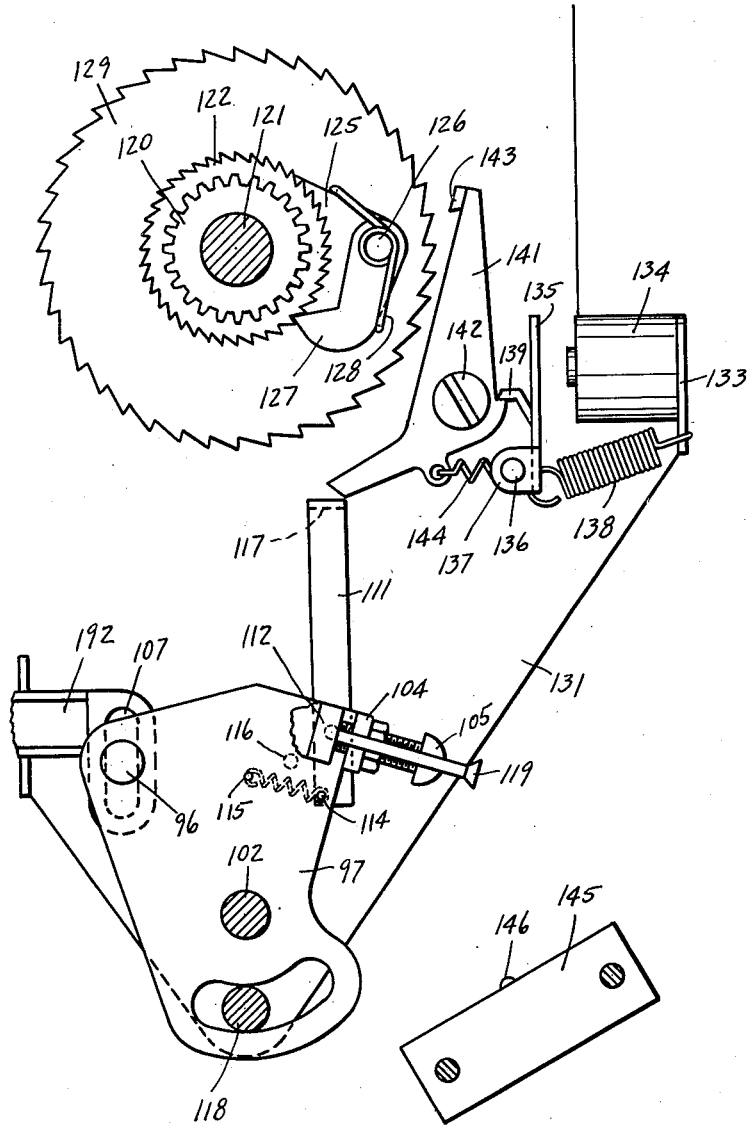
Fig. 20 is the same as Fig. 19 showing the parts at an early stage of their movement.

Near the edge opposite lug 104 actuator 97 is provided with a slot 107 to receive the rivet 96, which slot is of sufficient length to permit the swing of the actuator about its pivot 102, while permitting the thrust member 92 to move in its rectilinear path. (Fig. 19.) Near the lug 104, and protruding from the lower face of said actuator, there is an anchorage 108 in the form of a screw or dowel pin which holds a terminal eye of a contractile spring 109. The opposite end of said spring is anchored by a similar screw threaded into the lower face of the segment gear 103 adjacent the junction of its trailing radial edge and its arcuate portion, as indicated at 110.

A trip lever 111 is fulcrumed on a rivet 112 (Figs. 17, 19) to the underside of said actuator, said rivet being located adjacent the lug 104. Said lever projects radially from the free end of said actuator, its greater portion projecting beyond the edge thereof. Its shorter portion is urged clockwise (Figs. 20, 21) by a spring 113 anchored at one end in a perforation 114 thereof and at the other end to a dowel pin 115 spaced suitably and protruding from the lower face of the actuator. So located in contact with the edge of the short portion of said lever as to hold it normally in position parallel to the leading edge of the actuator, and in prolongation thereof, there is a stop 116 similar to the anchorage 112. The longer portion of said lever is bent downward into a contact member 117 for the purpose to be hereinafter explained. A stud 118 is rigidly fixed in a boss carried by the base plate 10, and is of smaller diameter than said boss and extends coaxially therewith. Said stud passes through the arcuate slot 101 in the actuator so that by its bearing against the shoulder formed by the larger diameter thereof, said actuator is prevented from deviating from the horizontal plane in which it oscillates.

The segment gear 103 is formed through 60 degrees of an arc, and is provided with 42 teeth in the disclosed form of the invention. It is free to oscillate upon the pivot 102 and is connected to the actuator 97 by the spring 109 and the anchorages thereof, as above described. Projecting horizontally from the lug 106 there is provided a contact member 119 (Fig. 17) consisting of a slender rod having its free end formed into a cone coaxial with the shaft, the base of said cone being the extremity thereof.

Figure 17:
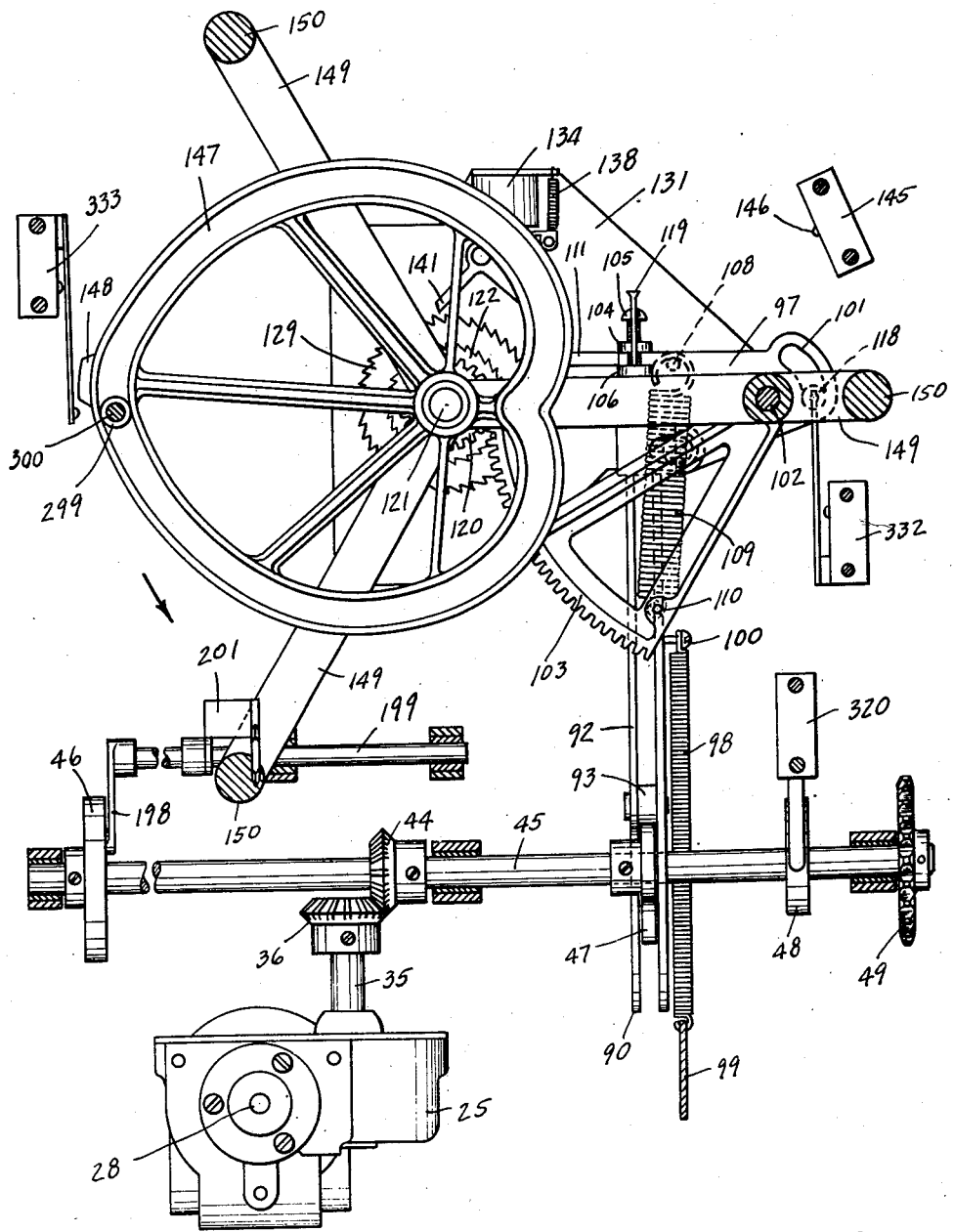
Fig. 17 is a plan view of the magazine positioning mechanism at rest.

The gear 103 meshes with a pinion 120, having 40 teeth, as herein disclosed, and free to revolve upon a vertical shaft 121. Integral with the pinion 120 there is provided a ratchet 122 of larger diameter than, concentric with, and located immediately below the pinion 120, as shown in Figs. 15, 17 and 19.

Supporting the pinion and bracket there is provided a boss 123 secured to the shaft 121 by a set screw 124. Said boss is provided with a lateral projection 125 (Fig. 19) extending beyond the periphery of ratchet 122. A shoulder screw near the extremity and on the upper surface of said projection provides a pivot 126 for a pawl 127. Said pawl is designed to engage and thrust adjacent the teeth of ratchet 122, being pressed into such engagement by a spring 128. Integral with the boss 123 there is a ratchet wheel 129 of larger diameter than ratchet 122 and concentric therewith. This ratchet is provided with 40 teeth, as herein shown. Suspended on the studs 130 (Fig. 14), there is a platform 131 which is generally triangular in shape with suspension points at each angle. About midway of each edge thereof there is struck up a pair of guides 132 spaced apart the width of the thrust member 92 and bearing against the flanks thereof. Substantially oppositely thereto, a lug 133 is struck up to provide support for an electromagnet 134 (Fig. 19). A circular opening concentric with shaft 121 permits the passage thereof to a mechanism to be hereinafter described which is suspended beneath said platform 131, as shown in Fig. 14.

The electro-magnet 134 is secured to lug 133 by staking its core to an aperture therein, one of the elements of its surface being in contact therewith. Disposed adjacent to said electro-magnet there is an armature 135 pivoted on a shoulder rivet 136, extending perpendicular to the upper surface of said platform 131. The pivotal mounting of said armature comprises a pair of ears 137 between which a spring 138 is connected at one end, the opposite end thereof being anchored to the lug 133. The said spring urges the armature away from the electro-magnet when it is deenergized. Protruding from the armature on the opposite side thereof from the electro-magnet, there is a latch 139 adapted to engage with a shoulder 140 extending from the edge of a pawl 141. Said pawl is comprised of a major lever and a minor lever between which it is fulcrumed upon a screw 142. On the end of the major lever there is a dog 143 positioned to engage and lock with ratchet teeth 129. The minor lever is connected with a spring 144 having its opposite end connected with the rivet 136. Said spring urges the dog 143 toward the ratchet teeth under spring tension, upon it being released by the armature 135.

Figure 21:
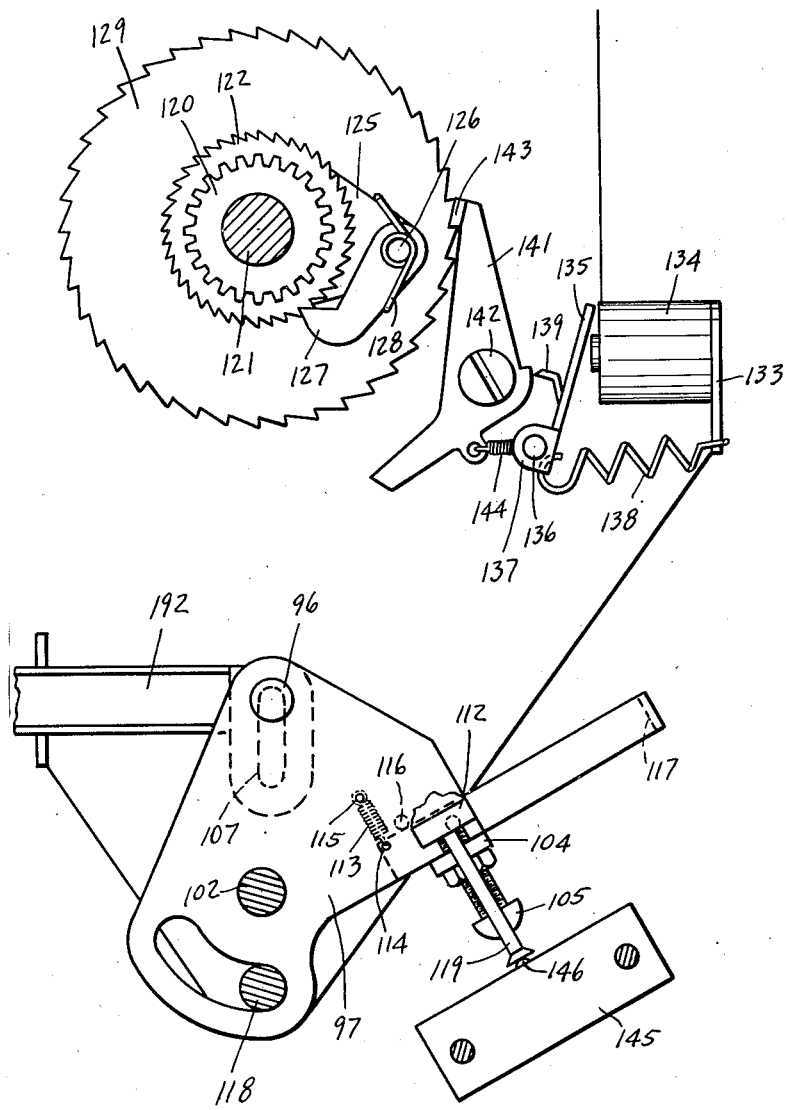
Fig. 21 is the same as Fig. 19 showing the parts at a later stage of their movement.
Figure 22:
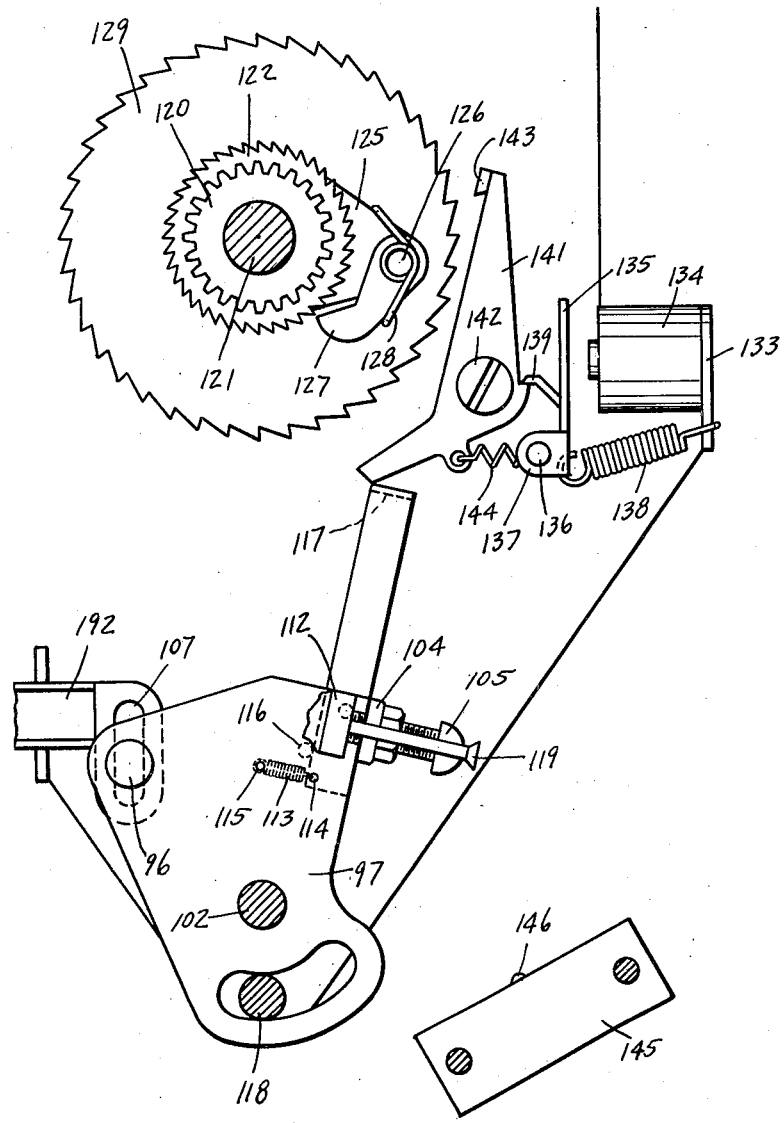
Fig. 22 is the same as Fig. 19 showing the parts at their final stage before returning to rest.

An electric switch 145 of well known form is suspended from the base plate 10 and is provided with a push button 146 extending into the arc of travel of the contact member 119, as shown in Fig. 21, so as to be pressed thereby to close a circuit through said switch for the purpose hereinafter described.

Figure 18:
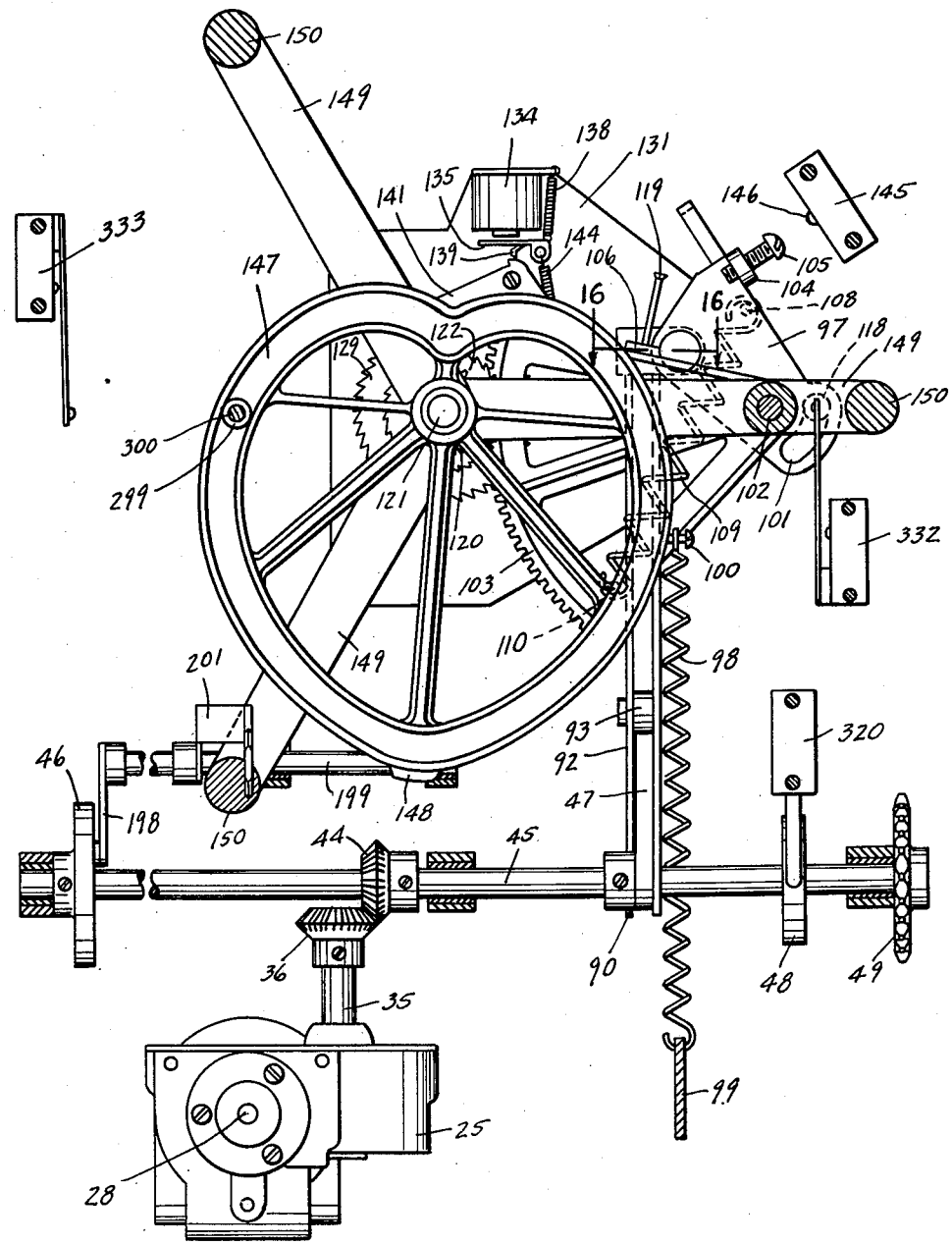
Fig. 18 is the same as Fig. 17 showing the parts in actuating position.

As illustrated in Figs. 17 and 18, there is provided a heart-shaped channel cam 147 rigidly secured to the upper extremity of the shaft 121 with its cam opening facing the underside of the base plate 10. At the tip of said cam there is a striker 148 in the form of a fin extending a little distance beyond the outer wall thereof and lying in the plane of the cam's revolution.

Figure 3:
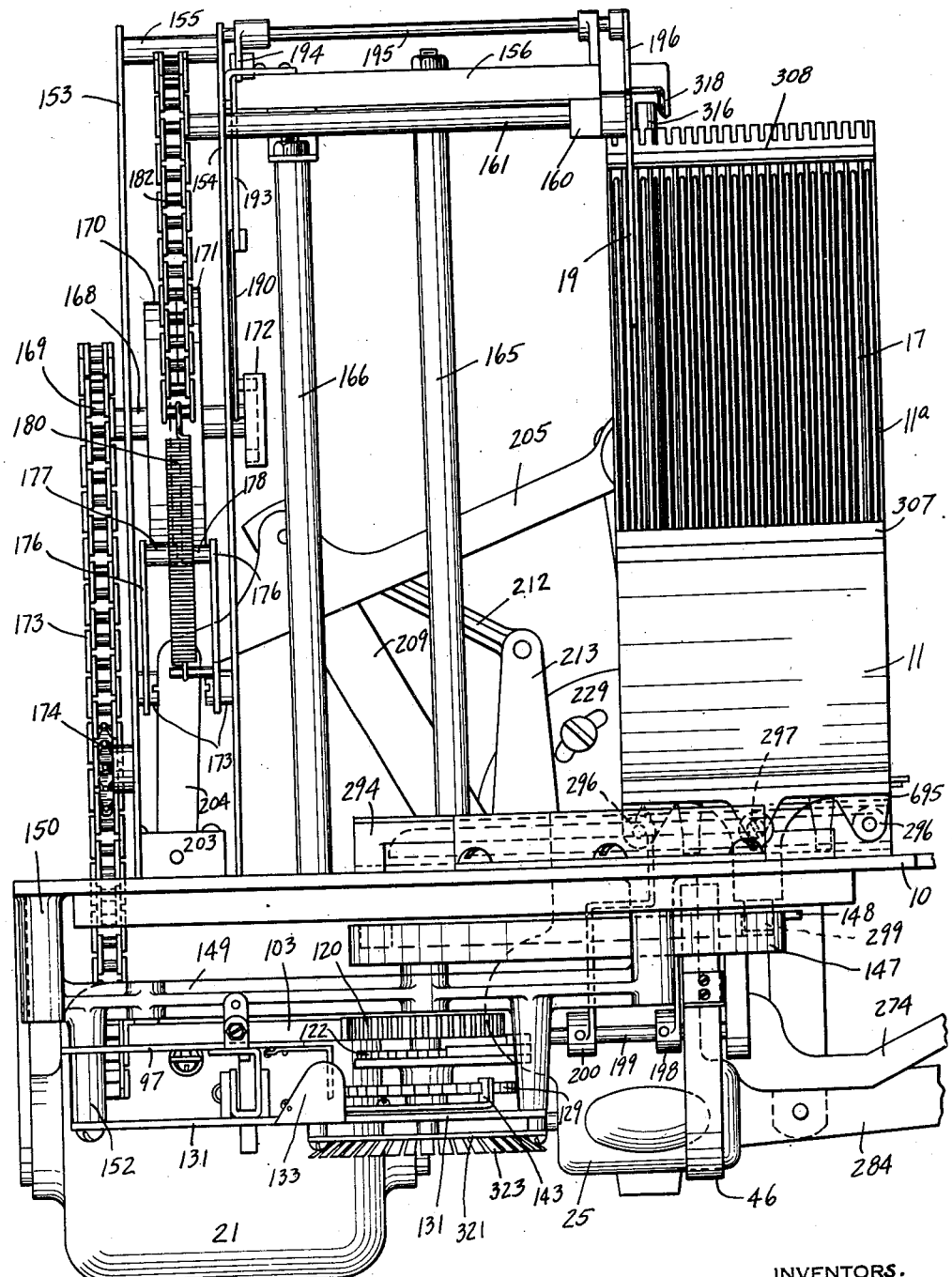
Fig. 3 is an end elevation showing the left-hand end of Fig. 1.

The entire magazine shifting assembly is supported by a spider 149 comprising three equally spaced arms, at the junction of which there is a bearing for the vertical shaft 121 (Fig. 1). At their extremities the arms of said spider have integral columns 150 formed therewith which serve to space and suspend said arms from the lower surface of the base plate 10. The bosses 151 depending from two of said arms, together with the boss surrounding the stud 118, and of suitable lengths, support the platform 131, as shown in Fig. 1. As shown in Fig. 3, a spacer 152 supports the actuator 97 in spaced relation to said platform 131.

A detailed description of the operation of the above-described mechanism is hereinafter more specifically described. However, it may be briefly noted at this point that the general operation is as follows. During the cyclic revolution of the cam shaft 45, the cam 47, operating on the follower 93, causes the member 92 to move longitudinally against the tension of spring 98, as shown in Figs. 13 and 17. In Fig. 17 said member is in its retracted position. In Fig. 18 it is in its full expanded position. Said member moves the actuator 97 to a corresponding extent which in turn rotates the segment 103 about its pivot to drive the pinion 120 through the spring 109. But as the segment 103 is thus actuated, the selective mechanism will energize solenoid 134 at a certain position so that the dog 143 will engage and latch with the ratchet 129 to arrest any further movement of pinion 120 and segment 103 while permitting the continued full cyclic movement of member 92 and actuator 97 through spring 109.

Upon thereby arresting rotation of pinion 120, the cam 147 will be arrested in such predetermined position. Since cam 147 controls the position of the magazine and records for transfer, as hereinafter described, the magazine will thereby be selectively positioned to present the selected record through the timely energizing of solenoid 134.

*Record transfer arms*

Figure 5:
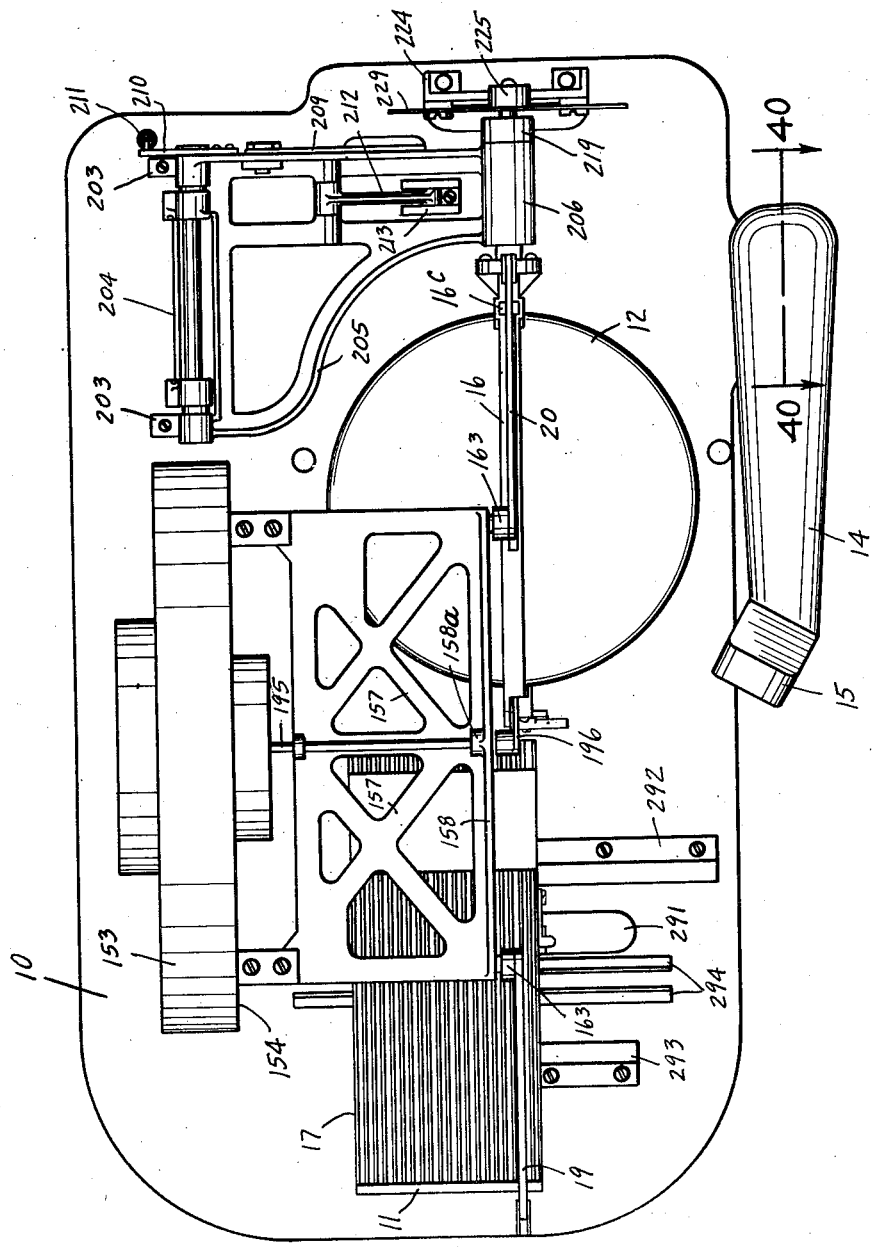
Fig. 5 is the same as Fig. 1 showing a top plan view.

Upon the magazine 11 being positioned to present a record 17 to the record transfer cage 16, in the manner above described, it is rolled from the magazine into the cage upon its peripheral edge. For this purpose the swinging arm 19 is provided, as shown in Fig. 1, the arm 20 acting to return the record from the cage to the magazine after reproduction. To one side thereof there is provided a pair of frame plates 153, 154 which extend in parallel planes perpendicular to the base plate 10 (Fig. 3), being attached to said base plate by suitable angles and screws. Said plates are secured together in spaced relation by the spacers 155. A head frame member 156 of generally rectangular outline, is sub-divided into two approximately square rectangles diagonally braced by the T-beams 157 (Fig. 5). The forward edge of the head frame is surmounted by a vertical web 158, the upper edge of which slopes upwardly from the corners to the highest point substantially in the center, at which point there is provided a boss 158a in the form of a cylinder having a horizontal axis for providing a bearing for a shaft 195.

Depending from each forward corner of the forward edge of vertical web 158 there is a similar boss 160 (Fig. 3) of somewhat larger diameter which serves as a bearing for the forward ends of a pair of rock shafts 161, 162 (Figs. 1 and 3), to which the record rolling arms 19 and 20 are secured, respectively, through the hubs 163 (Fig. 5).

Figure 4:
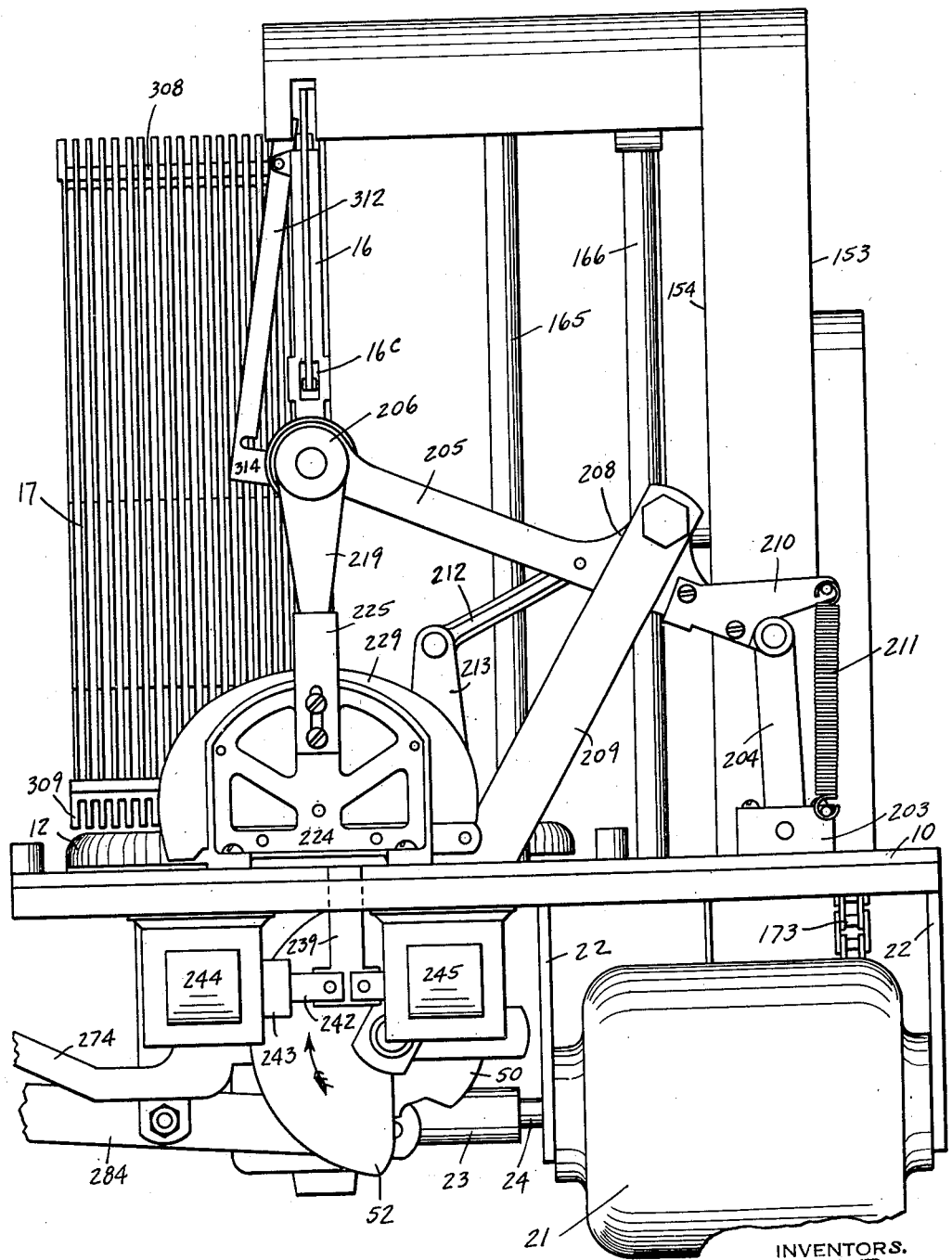
Fig. 4 is an end elevation showing the right-hand end of Fig. 1.

As shown in Fig. 1, there are three upwardly extending posts 164, 165 and 166 supported upon and secured to the base plate 10. Post 165 is located substantially at the mid point of the frame 156 while posts 164 and 166 are disposed beneath the ends of said frame near its rear edge (Fig. 4). As their axes substantially intersect those of shafts 161, 162, the upper ends of said posts are provided with U-shaped members 167, the lower arms of which are attached to the upper ends of said posts by means of cap screws, and the upper arms being fastened to the frame 156. The shafts 161, 162 pass through the interior of said members 167. The post 165 is provided with a concentric stud at its upper end, which, passing through the head frame 156, is secured by a nut bearing thereon. The head frame 156 and frame plate 154 are attached together by a pair of angle irons adjacent the upper corners of the plate.

Figure 2:
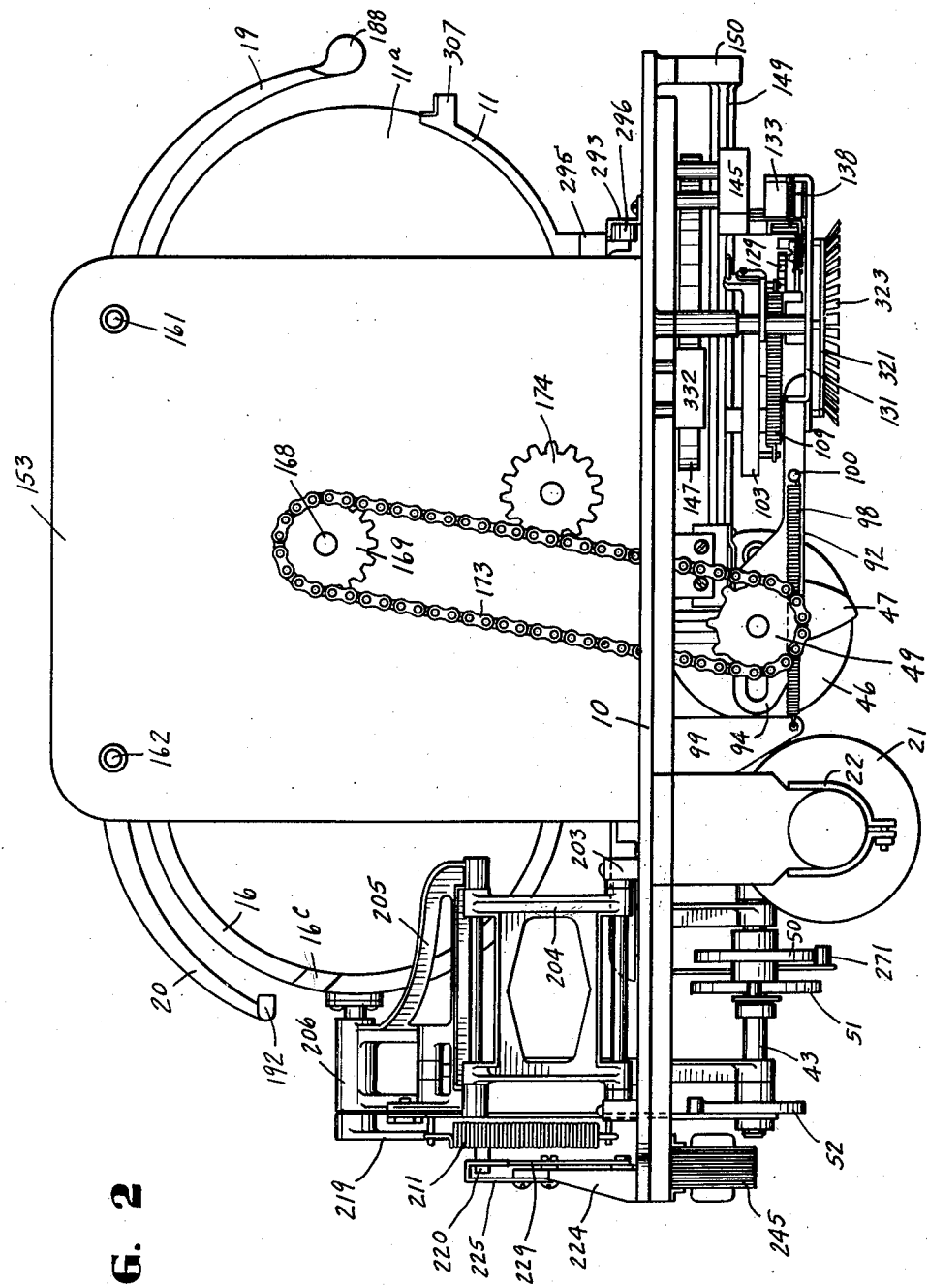
Fig. 2 is the same as Fig. 1 showing a rear elevation.

Referring to Figs. 2 and 6, the sprocket 49 is shown and attached to the rear end of shaft 45, and as shown in Fig. 3 there is a shaft 168 extending through the frame plates 153 and 154 at approximately their mid portions. On the rear end of said shaft there is keyed a sprocket wheel 169 corresponding to sprocket wheel 49. On said shaft intermediate said plates there is a pair of cams 170, 171, and at its forward end on the other side of plate 154 there is a channel cam 172. The sprockets 49 and 169 are rotated in unison through a driving chain 173. An idler sprocket 174, of smaller diameter than the other sprockets, is attached to the rearward face of plate 153 for engaging the said chain and diverting it toward a line connecting the centers of sprockets 49 and 169, whereby said chain is kept at proper tension.

Figure 23:
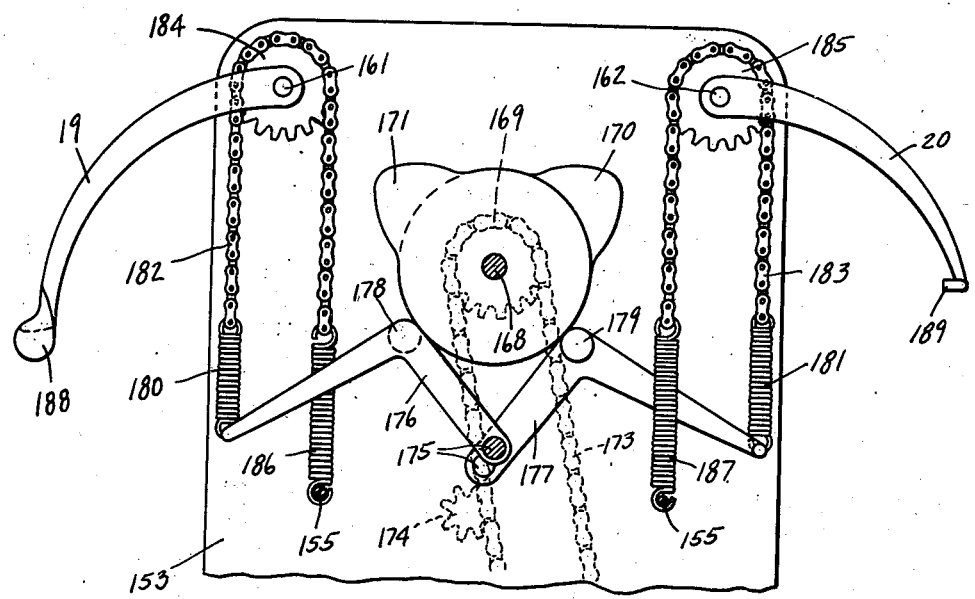
Fig. 23 is an elevation of the record moving mechanism with the front support thereof removed and the parts at rest.
Figure 24:
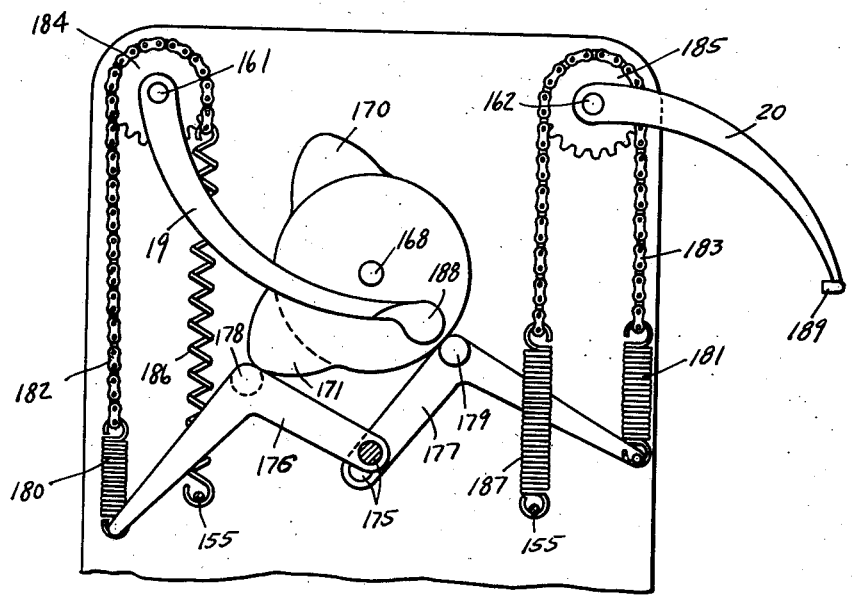
Fig. 24 is the same as Fig. 23 showing the parts at the completion of their movement and transferring a record from the magazine to the cage.

Secured below the shaft 168 and on the inner surfaces of said plates there is provided a pair of pivot supports 175 for pivotally supporting the arms 176, 177 having an elbow bend, as shown in Figs. 23 and 24. At the elbow of said arms there are provided cam followers in the form of rollers 178 and 179, respectively. The free ends of said arms are connected with springs 180 and 181, respectively. The opposite ends of said springs are connected with the chains 182 and 183 passing over the sprocket wheels 184 and 185. Said sprocket wheels are mounted upon the rock shafts 161 and 162, respectively, to which the record rolling arms 19 and 20 are respectively secured. The opposite ends of the chains are anchored to the springs 186 and 187 which in turn are secured to the plate 153 through the spacers 155.

The springs 180, 181 are stronger than the springs 186, 187. The latter are given a small initial tension which serves to keep the chains taut. The purpose of the chains is to provide extra elasticity to protect the record rolling mechanism from damage in case a record should become damaged during movement. Should arm 19, for instance, be arrested before it has reached the end of its swing, as shown in Fig. 24, preventing full expansion of spring 186, then spring 180 would expand, allowing the arm 176 to continue its full swing through action of the cam 171 without necessitating further movement of said arm 19. It may further be noted that cam 171 engages the cam follower 178, while cam 170 engages cam follower 179.

Also, it may be noted that arm 19 is provided with a head formed with a pair of guides 188 preferably made of thin sheet spring bronze for the purpose of embracing the edge of the record to insure its bearing properly thereagainst. Similarly, arm 20 is provided with a bifurcated tip 189 to embrace the record to insure its registry therewith.

From the foregoing, it will be noted that as the cam shaft 45 drives the sprocket 49, the cams 170, 171 will be driven to swing arm 20 for returning the record from the cage back to the magazine and then swing arm 19 to roll a record from the magazine to the cage.

Locking devices

Figure 26:
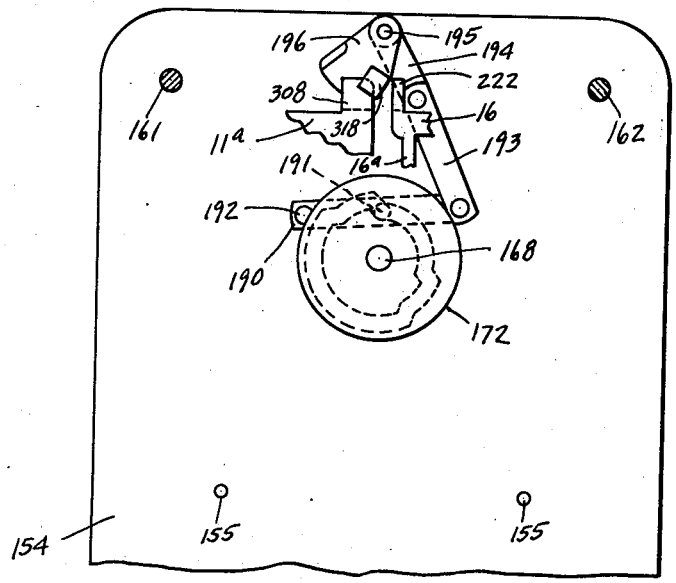
Fig 26 is an elevation of the upper cage and magazine locking member with associated parts, showing it in magazine locking position.
Figure 27:
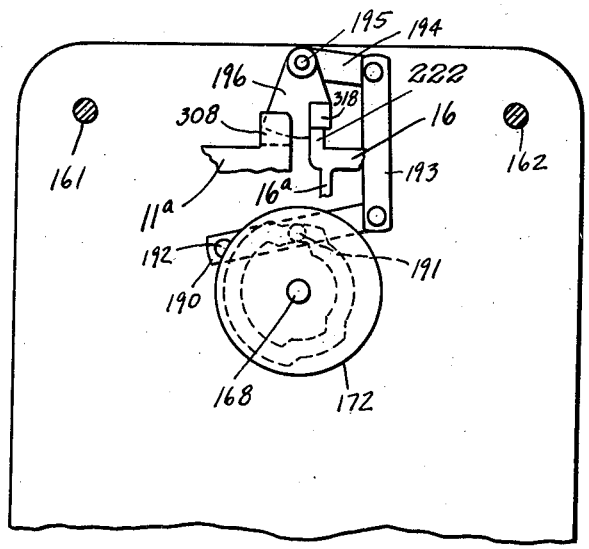
Fig. 27 is the same as Fig. 26 showing the locking member in cage and magazine locked position.
Figure 28:
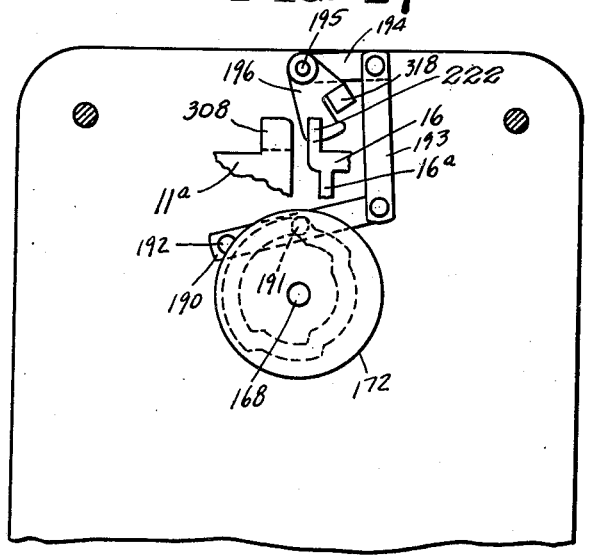
Fig. 28 is the same as Fig. 26 showing the locking member in cage locking position.

Referring to Figs. 26, 27 and 28, and also as further illustrated in Figs. 3, 47, 48 and 49, there is provided a locking device arranged to hold the magazine and cage in registry with each other during the transmission of a record therebetween, and whereby they will be accurately alined. To this end there is provided on the forward end of the shaft 168, the cam 172 above referred to (Fig. 3). Said cam is provided with a channel opening toward the frame plate 154. Between the plate and cam and pivoted to the former, there is provided a lever 190 carrying a follower 191 operating within the channel of said cam. Said lever is pivoted to the plate at 192 and pivotally connected at its free end to a pitman 193 which in turn is pivoted at its opposite end to a lever 194. Said lever is secured to a shaft 195.

Figure 25:
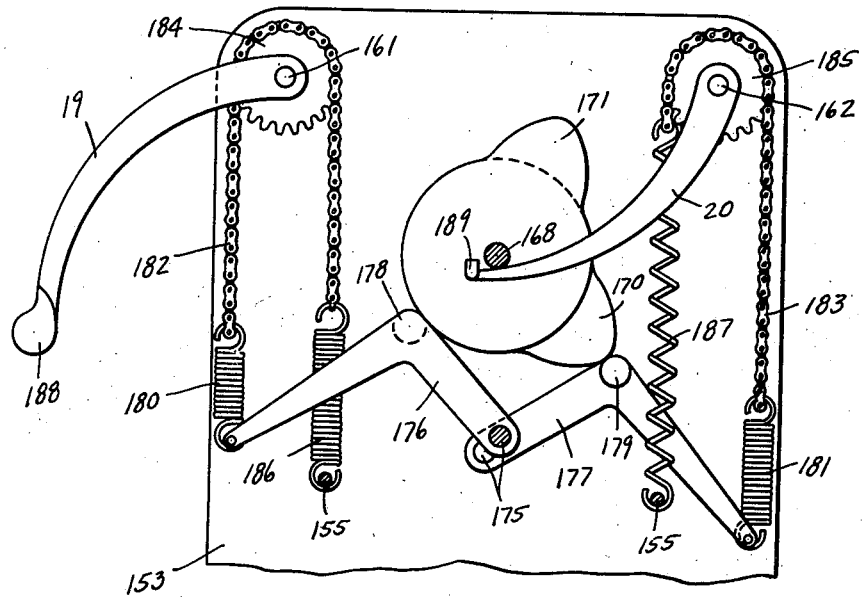
Fig. 25 is the same as Fig. 23 showing the parts at their extreme position in returning a record from the cage to the magazine.

As the follower 191 moves from the outer portion of the channel in the cam to the middle portion thereof and then to the inner portion, shaft 195 is caused to rock, carrying with it a locking ear 196. This oscillates the ear through a small arc, arresting it in three different positions, as shown in Figs. 26, 27 and 28. In Fig. 25 the follower is shown in the innermost portion of the cam, locking the magazine and cage in alignment. Fig. 27 shows it in the intermediate portion of the cam, locking the cage in position. Fig. 28 shows it entering the outermost portion of the cam so as to be swung clear of both the cage and the magazine.

Figures 29, 30:
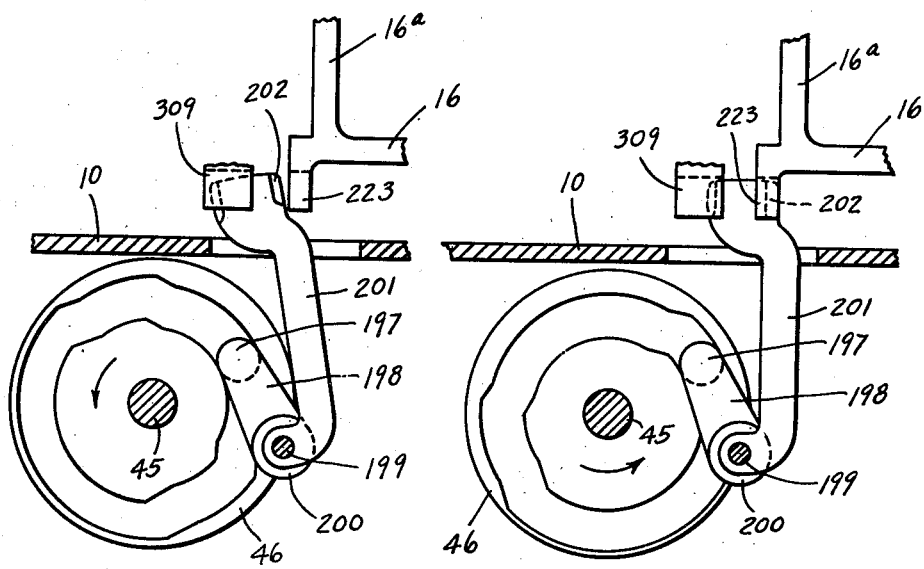
Fig. 29 is an elevation of the bottom cage and magazine locking member showing it in magazine locking position.
Fig. 30 is the same as Fig. 29 showing it in magazine and cage locking position.
Figure 31:
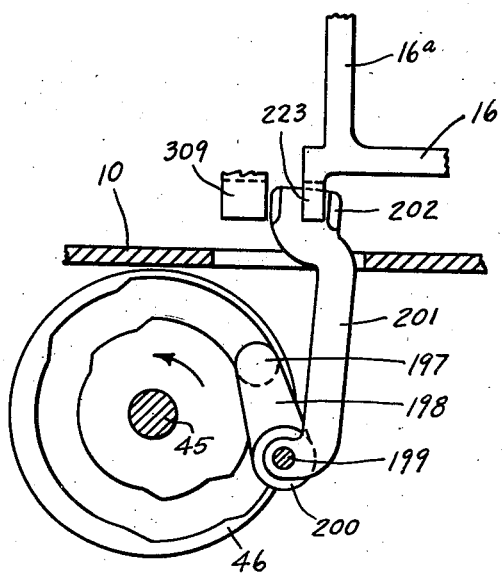
Fig. 31 is the same as Fig. 29 showing it in cage locking position.

While the above described locking device locks the magazine and cage in alignment at the top thereof, a similar device locks them in alignment at the bottom, as shown in Figs. 29, 30 and 31. In respect thereto, reference is made to Fig. 6, showing the cam 46 in the form of a channel similar to that of the above-described cam 172, said cam being driven by the cam shaft 45 immediately below the base plate 10. It likewise has an outer portion, intermediate portion and inner portion of the cam channel.

Operating in the cam channel there is a roller 197 mounted on an arm 198 to the opposite end of which is rigidly connected a rock shaft 199. Said rock shaft is supported in suitable bearings, as shown in Fig. 6, secured to the under surface of the spider arm 149 (said bearings having been omitted from Figs. 29, 30 and 31 for the sake of clearness). Secured on said shaft 199 there is a hub 200 which supports a locking arm 201. Said arm extends upwardly through an aperture in the base plate 10 and is provided thereabove with chamfered edges 202 on opposite sides thereof extending in the plane of the cage and the records substantially through the center of the turntable, as illustrated in Fig. 1, to engage and lock said cage and magazine in aligned position at the bottom thereof during the transfer of a record, as shown in Fig. 30.

Record transfer and reversing mechanism

The record is initially transferred from the magazine 11 to the cage 16 by the arm 19. Thereupon the cage 16 is operated to turn it from the vertical to the horizontal position with a selected side uppermost for lowering into playing position upon the turntable. Reference is made in this connection to Figs. 1 to 6, inclusive, and Figs. 32 to 35, inclusive, and particular reference is made to Figs. 5 and 33.

Figure 32:
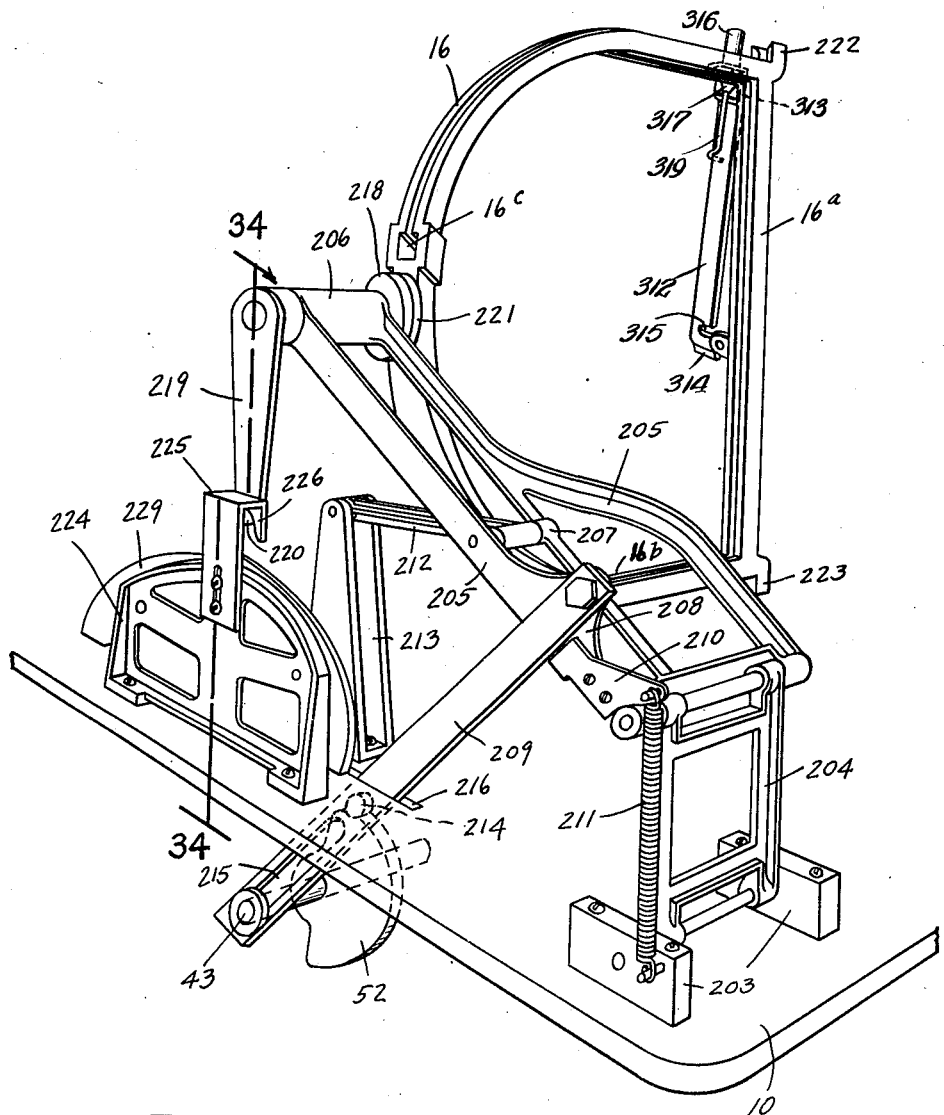
Fig. 32 is a perspective view of the record placing mechanism in position to receive or discharge a record.
Figure 38:
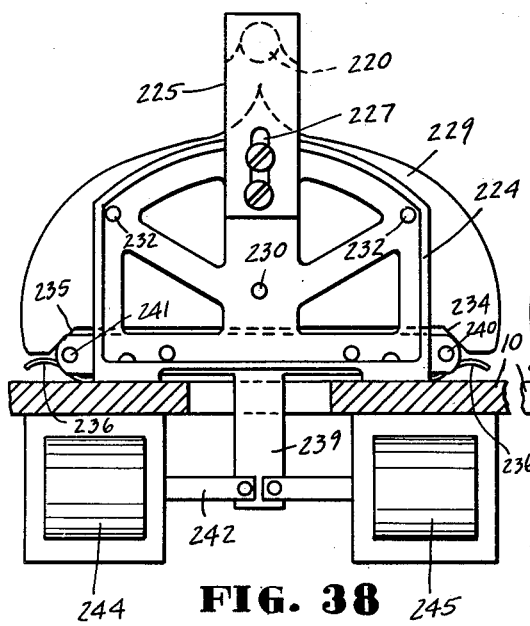
Fig. 38 is a rear elevation of the record reversing cam at rest.

Located on the upper surface of the base plate 10 there is a pair of supporting blocks 203 between which a rectangular frame link 204 is pivotally supported. The upper end of said link is pivotally connected with a walking beam frame generally designated at 205. Said frame consists of two spaced parallel longitudinal members and a third divergent member lying in the same plane and connected together by a fourth transverse member from the outer face of which the pivotal bearings protrude (Figs. 5, 32). The parallel members are connected at their opposite end by a transverse cylindrical bearing 206, as shown in Figs. 34, 35. Also, intermediate the ends of the parallel members there is a pair of bearings 207.

Rising from the upper edge of one of the longitudinal members there is provided a lug 208 to which one end of a pitman 209 is pivotally connected. Also attached to said member adjacent its pivotal connection with link 204 there is a short arm 210 to which one end of a spring 211 is connected. The other end of said spring is connected with one of the blocks 203, so as to constantly urge said arm downwardly and serve to counter the weight of the other end of the walking beam 205. Pivotally connected with the walking beam 205 and supported by bearings 207, there is a link 212 having its other end pivotally connected to a supporting standard 213 secured upon and extending upwardly from the base plate 10.

From the above, it will be noted that said parts provide a cross linkage with two contiguous fixed and two contiguous moving links, the result of whose interaction is to produce vertical movement of the axis of cylindrical bearing 206. For effecting the vertical movement of bearing 206, the walking beam 205 is actuated by the cam 52 rigidly connected to the cam shaft 43. The pitman 209 is provided near the lower end thereof with a cam follower 214 in the form of a roller engaging upon the cam surface of cam 52, thereby moving said pitman in a substantially straight line. But said pitman is straightened in its longitudinal movement by engagement of shaft 43 in a longitudinal slot 215. Said pitman passes through an aperture 216 in the base plate 10.

Referring to Fig. 35, it will be noted that the cylindrical bearing 206 supports a shaft 217 coaxially thereof through suitable ball bearings. Said shaft terminates at one end in a circular concentric flange 218. Attached to the outer end of the shaft 217 there is an arm 219 (Fig. 34) having on the opposite end thereof a cam follower in the form of a roller 220. A spring 221 has one end thereof connected with said arm adjacent the follower and the other end connected to the base plate 10.

The record transfer cage 16 comprises two semi-circular arms slightly spaced apart in the upper half and grooved in the lower half, as illustrated in Fig. 32. Said cage conforms generally to the contour of a record into which the peripheral edge of the record may be received through the spaced forward bars 16a formed integrally therewith. The central and rearward portion of the curved arms forming the cage are pivotally supported by the bearing 206. The depth of the groove in the lower half of the cage, as indicated at 16b, is such as to freely receive and support the unscored margin of a record for transmitting the same, but be freed thereof when the record is in playing position.

Thus, a record received in the cage will be retained therein while being turned from vertical to horizontal position and placed upon the turntable or elevated therefrom. But when the record is centered on the turntable by the centering pin 13, it will be free to rotate within the cage. Said cage is pivotally supported by the bearing 206, as above mentioned, through a rigid connection, such as screws or the like, between the flange 218 and a complementary flange 221 formed as a part of the cage, whereby said cage is supported by and may oscillate within said cylindrical bearing. The space between the upper curved bars of the cage is of sufficient width to permit passage therethrough of the arm 20 when rolling a record therefrom, said arms also being provided with an enlarged space indicated at 16c through which the bifurcated end 192 of said arm may pass.

At the forward upper and lower corners of the cage and in alignment with the vertical bars 16a there are provided bifurcated upwardly and downwardly extending projections 222 and 223, respectively, between which the locking ears 196 and 201 engage when aligning the cage with the magazine, as above described (Figs. 1, 28 and 31). The cage 16 is turned to one side or the other from a vertical to a horizontal position, as illustrated in Figs. 36 to 39, inclusive. Supported upon the base plate 10 there is an upwardly extending bracket 224 (Fig. 32). Extending upwardly therefrom there is a guide frame 225 bent upon itself to provide an overhanging lip 226. Said frame 225 is adjustably secured to the bracket by screws extending through a longitudinal slot 227 so that it may be adjusted to the proper distance above the base plate 10. The lip 226 is provided with an upwardly curved recess or notch 228 adapted to conform to the outline of the roller 220 (Figs. 33, 34).

Pivotally supported upon the bracket and suitably spaced therefrom by bosses so as to extend in the plane of the lip 226, there is a cam 229. Said cam is pivoted to oscillate about a screw having its center at 230 and which pivotally supports the cam. Radially from its pivotal support, there are arcuate slots 231 through which limiting and retaining screws 232 extend, said screws being secured upon the bracket 224.

Figure 39:
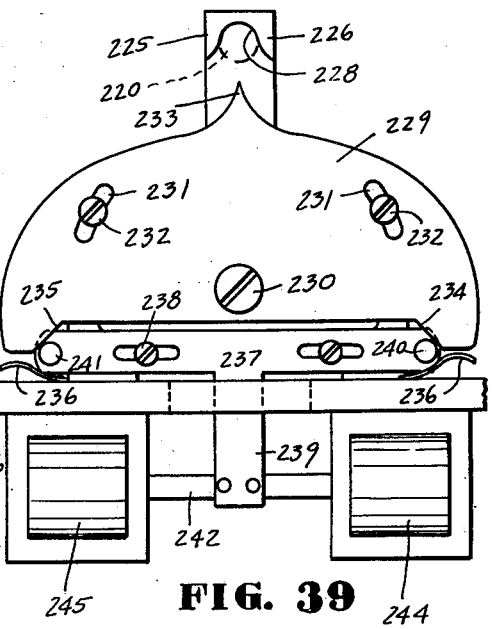
Fig. 39 is a front elevation thereof.
Figure 36:
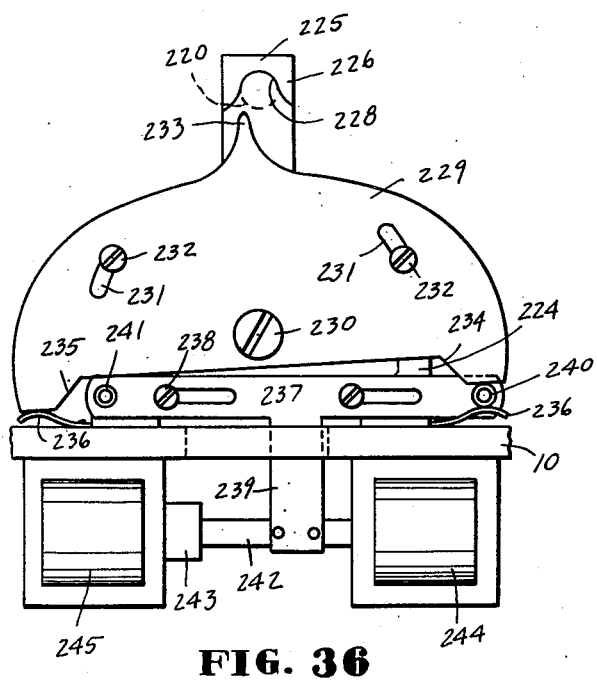
Fig. 36 is an elevation of the record reversing cam in tilted position.
Figure 37:
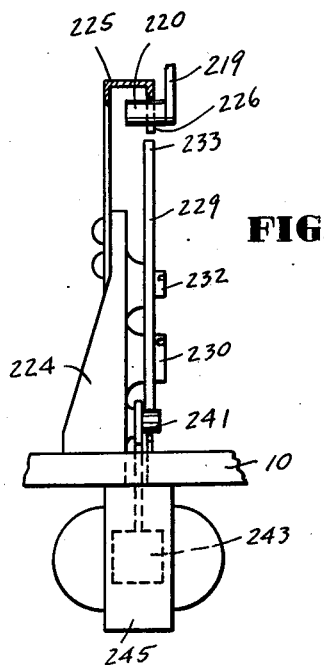
Fig. 37 is an end elevation thereof.

The upper edge of said cam is a cycloidal curve generated about the axis of shaft 217 (Figs. 34, 35). As said shaft is raised or lowered in a straight vertical line by the action of the walking beam 205, said cam will act to divert the roller 220 to one side or the other until arm 19 and cage 16 moving therewith have swung through an arc of 90 degrees to a position shown in Fig. 33. The direction of said diversion is determined on tilting of cam 229 to one side or the other of its central position, for example, from its central position, as shown in Fig. 39, to one side thereof, as shown in Fig. 36. In the latter portion, it will be noted that the point 233 of the cam is moved to one side of the recess 228 and off center relative thereto. When said cam is moved to the left, as shown in Fig. 36, the roller 222 will be guided to the right for turning the cage to present one side of a record. When said cam is moved to the right of its center position, then said roller will be guided to the left, turning the cage to the opposite horizontal position for presenting the other side of the record for play.

The swinging of the cam to a predetermined side off center for selectively turning the cage and record to one side or the other is accomplished by the following described mechanism. The lower edge of said cam is formed in a straight line along its central portion, terminating in oppositely disposed outwardly sloping shoulders 234 and 235. Immediately therebelow there is provided a pair of plate springs 236 secured to the base plate 10. An actuating slide 237 is mounted for reciprocatory movement upon the lower part of the bracket 224 by means of the screws 238 extending through the longitudinal slots formed therein. Said slide 237 is provided with a centrally disposed downwardly extending arm 239. Extending inwardly from the slide adjacent each end thereof, there is provided a pair of rollers 240 and 241 in position to engage the shoulders 234 and 235, respectively. Thus, when the slide is reciprocated, it will engage the cam shoulders 234 or 235 so as to tilt the cam to one side or the other for the purpose above described.

Said slide is actuated through an extension 239 passing downwardly through a slot in the face plate 10 and connected at its lower end with a pair of links 242 which in turn are connected at their outer ends to a pair of cores 243 of laminated sheet steel contained within the coils of a pair of solenoids 244 and 245 suspended from the lower surface of said base plate.

Thus, when solenoid 244 is energized, as indicated in Fig. 36, the core is drawn inwardly pulling the extension to one side, correspondingly moving the actuating slide 237 and forcing the roller 240 under the shoulder 234 so as to tilt the cam to the position shown.

Tone arm control

Figure 40:
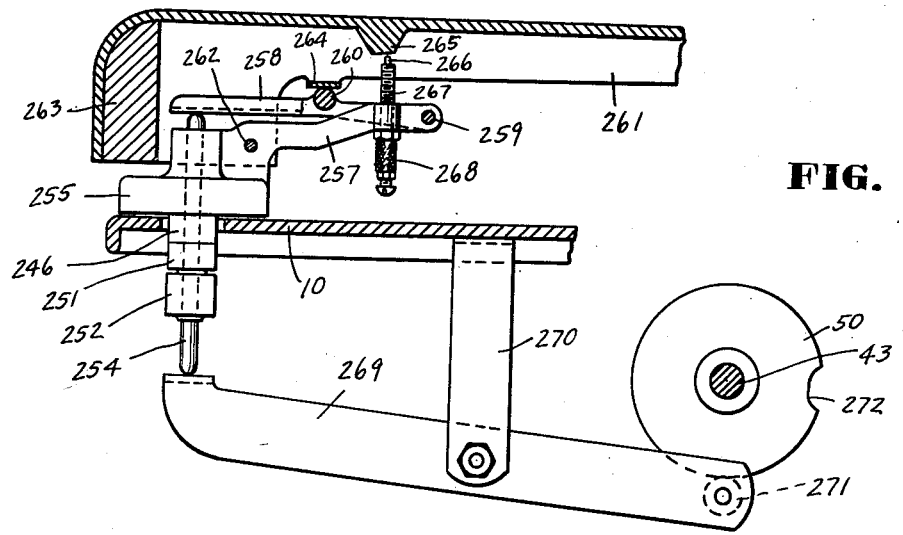
Fig. 40 is a longitudinal section through a portion of the tone arm taken on the line 40—40 of Fig. 5, showing the tone arm in raised position with the operating parts in elevation.
Figure 41:
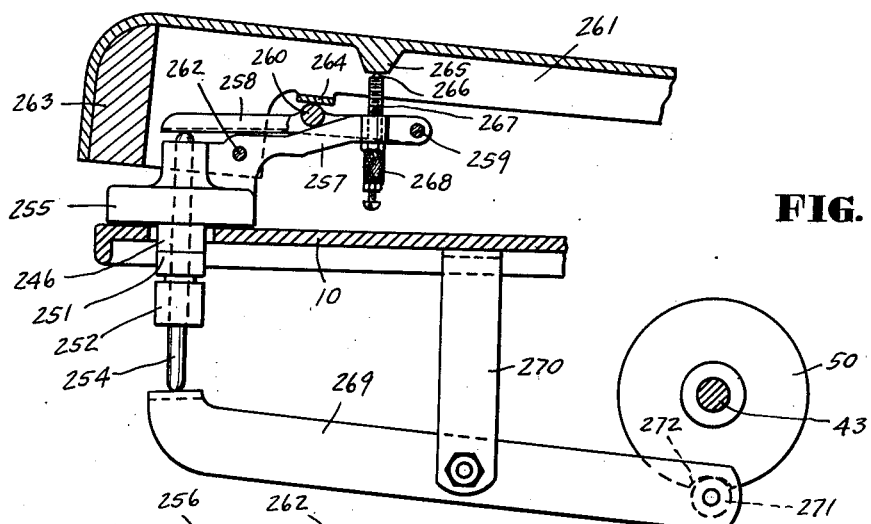
Fig. 41 is the same as Fig. 40 showing the tone arm in lowered or playing position.
Figure 42:
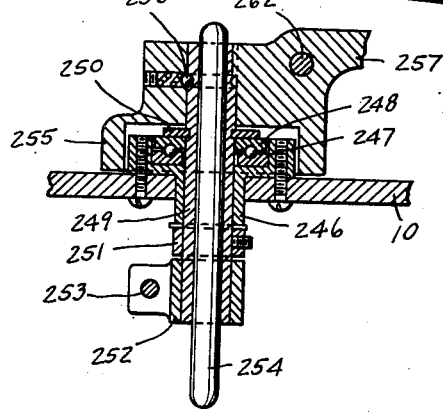
Fig. 42 is a vertical section taken on the line 42—42 of Fig. 6.

The mechanism for raising and lowering the tone arm is disclosed in Figs. 40, 41 and 42. Considering Fig. 42 there is provided a socket 246 secured in vertical position through an aperture in the base plate 10, the lower extended portion providing a cylindrical bearing and the upper portion providing a bearing receiving cup 247 containing the thrust bearing 248. Extending through the socket and bearings there is provided a sleeve 249 provided with circumferential grooves. One of said grooves contains a washer 250 bearing upon the upper race of the ball bearing 248 for supporting said sleeve axially thereof. Surrounding the sleeve with its upper edge separated from the lower end of the socket by a felt washer, there is provided a collar 251 secured thereto by a suitable set screw. Beneath said collar there is provided a hub 252 clamped thereto by a screw 253 passing through a pair of radially extending lugs. Free to slide longitudinally in said sleeve there is a lift pin 254 for raising and lowering the tone arm as hereinafter described.

A turret 255 surrounds the cup 247 of the socket, having a sliding key lock (see dotted lines Fig. 42) with the exterior of sleeve 249. In one side of said turret there is a radially disposed hole threaded internally in which there is provided a spring pressed ball latch 256 for engaging with the upper peripheral groove in the sleeve 249. Thus, the turret may be slipped on and off of the sleeve and latched thereon by said spring pressed ball latch to facilitate replacing. Formed integral with the turret and extending from one side thereof, there is an arm 257 upon which a lever 258, of the second class, is pivotally mounted at 259. Intermediate the ends of said lever there is provided a roller 260 and the free end thereof is freely engaged at its underside by the lift pin 254.

The tone arm 261 is of conventional design and is pivoted to the turret 255 at 262, the extreme rear end of said tone arm embracing and securing therewith a counterweight 263. Extending across the under side of the tone arm there is provided a bridge 264, the lower face of which bears upon the roller 260 and is supported thereby when the tone arm is in its raised position, as illustrated in Fig. 40. Also, depending from the underside of the tone arm forwardly of said bridge there is a small boss 265 positioned to engage an adjustable cushioning member 266 supported by the arm 257. Said cushioning member is yieldingly supported within a recessed adjustable screw 267 by a spring not shown, which screw may be adjusted by the knurled portion 268. The purpose of said cushioning member is to receive the bracket of the tone arm as it is lowered just prior to the stylus engaging the surface of the record, so that under its yielding action the stylus may be gently placed in playing engagement.

The tone arm is raised and lowered by the pin 254 through the medium of a lever 269 fulcrumed upon the lower end of a bracket 270 depending from the underside of the base plate 10. The opposite end of the lever is provided with a roller 271 bearing against the periphery of the cam 50 driven by the shaft 43. Said cam is provided with a depression 272 into which the roller engages for lowering the tone arm during the playing operation, as shown in Fig. 41. The remaining periphery of the cam engages the roller to maintain the tone arm in elevated position during the record changing cycle, as shown in Fig. 40.

The mechanism for swinging the tone arm horizontally is illustrated in Figs. 43, 44, 45 and 46. The hub 252 is provided with a lug 273 to which a thrust rod 274 is pivotally connected so that longitudinal movement thereof will swing the collar which in turn is clamped to the sleeve 247 and thereby swing the tone arm free of the record during the record changing action and over the beginning of the record for reproduction. Said rod is adjustably connected with an extension 275 through a pin and slot engagement and a lock screw 276 so that the swinging action of the tone arm may be effectively adjusted. The extreme end of the extension 275 is provided with a cam follower in the form of roller 277 which engages the cam surface of cam 51 driven by the cam shaft 43. Said extension is further provided with a longitudinal bearing slot 278 through which the shaft 43 extends so as to permit reciprocable movement of the extension and rod 274 through the action of the cam.

Associated with cam 51 there is a presser 279 which converts the cam into a channel through that portion of its surface indicated at 280, said presser being pivoted to the cam and connected therewith through a spring 281. It is thereby yieldingly held against a stop pin 282 which limits its inward motion to maintain proper camming distance. The profile of the presser follows that of the cam portion 280 so that when said cam has revolved in the direction indicated by the arrow, the presser is forced radially therefrom, swinging upon its pivotal mounting to admit the roller 277 between its cam surface and the corresponding cam portion. The pressure exerted by the spring 281 urges the roller inwardly against the cam surface 280 a depth sufficient to swing the tone arm from its position of rest beyond the turntable to a position in which its stylus is poised above the beginning of a record thereon. Following the lowering of the stylus onto the record, the cam 51 revolves until the roller 277 lies opposite the innermost surface of the cam, which is sufficiently deep to not be engaged during the traversing of the record by the stylus.

Figure 43:
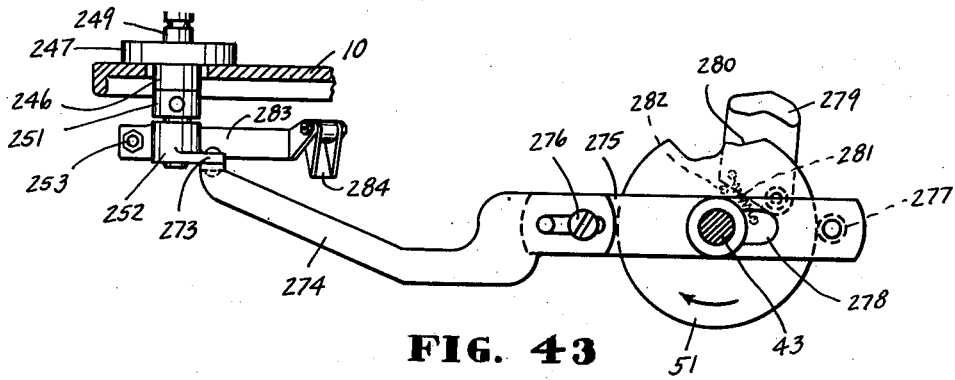
Fig. 43 is an elevation showing the tone arm swinging mechanism in position for swinging the tone arm free of the turntable.
Figure 44:
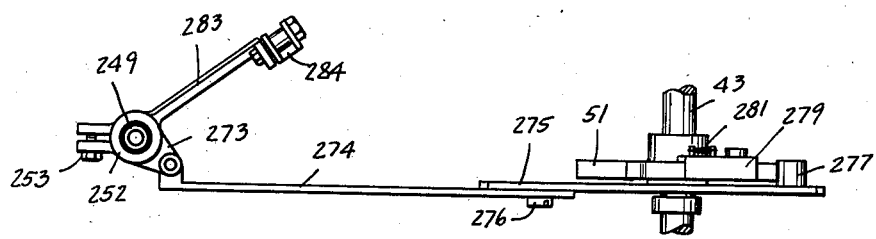
Fig. 44 is the same as Fig. 43, showing a plan view.
Figure 45:
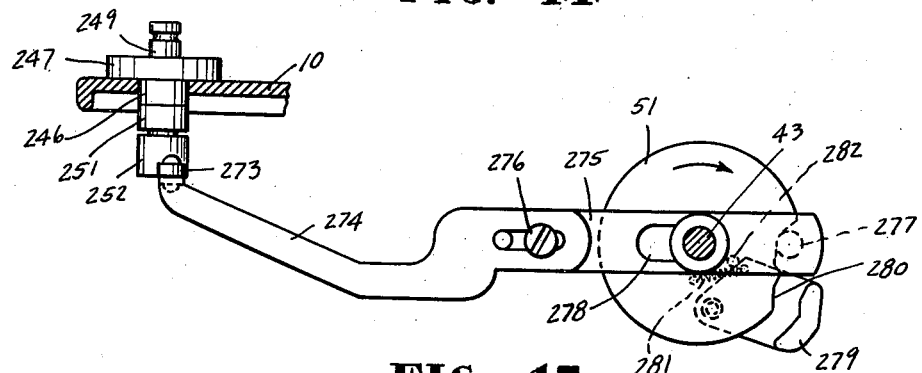
Fig. 45 is the same as Fig. 43 showing the parts in record playing position.
Figure 46:
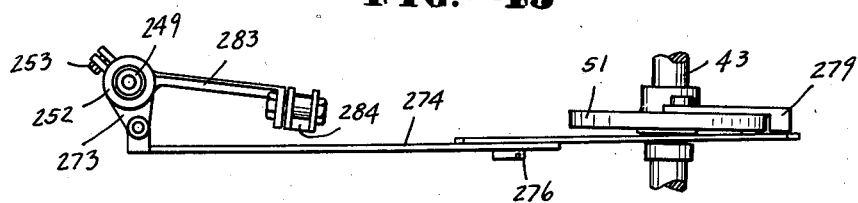
Fig. 46 is the same as Fig. 45, showing a plan view thereof.

Thus, the position of cam 51 at the end of reproduction is that illustrated in Fig. 44, whereas its position during the record changing operation is that shown in Fig. 43. When the end of the record is reached and the trip mechanism actuated, as hereinafter described, said cam will be set into motion in the direction of the arrow, and the cam follower will be thereupon moved from the innermost surface to the outermost surface of the cam which will swing the tone arm clear of the turntable to permit the record changing operation. It will be maintained by the cam in its outward position until the follower engages the presser 278, whereupon the tone arm will be swung to a position over the beginning of the record. After the stylus is lowered onto the record, the continued movement of the cam will again bring the innermost surface opposite the follower so that the reproducer will be free to move inwardly with the record grooves.

Tripping mechanism

For tripping the mechanism upon completion of the record, a pawl arm 283 projects from the hub 252 in angular relation to the lug 273. It carries at its free end a pivotally mounted pawl 284. As shown in Figs. 10 and 12, the pawl 284 is arranged to ride over and cooperate with the ratchet teeth 285 on a trip arm 286. Said arm is pivoted at 287 on a bracket 288 depending from the base plate 10. Said arm is Z-shaped and has the upper edge of its upper portion 289 abutting against the lower edge of the lug 73 on the latch 71. At the extreme opposite end and beyond the ratchet teeth 285 there is provided an enlarged head 290 so as to extend above the ratchet teeth.

The position of the trip arm is such that as the pawl 284 swings about the sleeve 249 (Figs. 43, 46), it will ride over the ratchet teeth 285. Thus, as the tone arm moves inwardly with the playing of a record, the pawl rides over the ratchet teeth toward the head 290. If the reproducer moves into a spiral groove, the pawl will be carried into engagement with the head 290 so as to force it downwardly and swing the lever 286 from the positions shown in Figs. 10 and 11 to that shown in Fig. 12. The same effect results when the reproducer oscillates by an eccentric record so that the pawl in its backward movement locks with the ratchet teeth to force the lever downwardly. This downward movement of the lever 286 raises the latching plate 71 to release the clutch actuating arm 55 and thereby drive the record changing mechanism.

The magazine

For permitting reciprocal movement of the magazine for positioning it to present a record for play, the base plate 10 is provided with an elongated slot 291, as shown in Fig. 5. Spaced therefrom and in parallel relation thereto, and at each side, there is secured on the base plate, guide rails 292 and 293. Also parallel with said slot and spaced from each other to one side thereof there is a pair of guides 294. A magazine carriage 295 (Fig. 2) moves longitudinally parallel with said slot and rails. Said carriage is guided by the rails through the rollers 296 (Figs. 1, 2 and 3), while supported by the rollers 297 bearing on the base plate 10 (Figs. 55, 56 and 57). Horizontal deviations from movement of the carriage parallel to the slot 291 are prevented by a pair of rollers 298 operating between the guides 294.

The carriage carrying the magazine is reciprocated by the heart-shaped cam 147 (Figs. 6, 17 and 18) in which a roller 299 travels, said roller being mounted upon a boss 300 extending downwardly from the under surface of the carriage through the slot 291 in the base plate 10. It will, therefore, be observed, reference being made to Figs. 1, 3, 5, 6, 17, 18, 55, 56 and 57, that the rotation or movement of said cam 147 to a predetermined position controlled by the selective mechanism hereinafter described, will reciprocate the magazine to position the record to be played in alignment with the transfer cage. For this purpose the heart-shaped cam is driven by the cam shaft 45 during the record changing operation until it reaches the prescribed position, whereupon its further movement is arrested.

The magazine 11 is supported by the carriage 295 through the medium of a casting 301 (Figs. 52, 54) which is provided on its underside with a cylindrical swivel 302 passing into a mating recess 303 in the carriage 295. Equally spaced from said swivel there is a pair of studs 304 passing through the arcuate slots 305 in the carriage 295, said studs being threaded and locked thereunder to retain the casting on the carriage while permitting it to revolve thereon within the limitations of said slots. By means of this arrangement, the magazine may be swiveled on the carriage to a convenient position for the removal and replacement of records.

The upper surface of the magazine carrying casting 301 is provided with a series of grooves (21 shown herein) 306 extending longitudinally thereof and spaced over its entire upper surface into which the magazine partitions 11a for providing vertical stalls for the records, are secured. They are semi-circular in shape along their left edges (as shown in Fig. 1), with their upper, lower and right-hand edges being straight. The right-hand straight edges of the series of partitions 11a are cut out as indicated at 11b to permit convenient grasping of the records 17 for removal therefrom.

A bar 307 is formed integrally with the magazine casting 11, said casting and bar being provided with grooves corresponding with the record receiving spaces between the partitions whereby they will be reinforced along their lower outer edges. A pair of registering combs, an upper comb 308 and a lower comb 309, are provided at the top and bottom, respectively, along the right-hand edges of said partitions (Figs. 1, 3, 52 and 53). Each comb is provided with a number of teeth corresponding with the number of partition plates, the spaces therebetween being in alignment with the record stalls for receiving the locking members 196 and 201 above described (Fig. 1). Thus, the magazine is latched with the record stall in exact alignment with the cage 16.

The casting 301 and the carriage 295 are held in alignment during operation of the phonograph by a latch 310 pivotally mounted on the former and engageable with a keeper 311 on the latter (Figs. 52, 53, 54 and 57). When it is desired to change records in a magazine, the magazine may thereby be unlatched from the carriage for permitting limited swinging movement of the magazine, as above described, to position the right side thereof to expose the finger opening 11b toward the front of the machine to withdraw and replace the records. Upon swinging the magazine back into operative position, it is latched to the carriage so as to function for record changing.

Record transfer cage

To insure that a record fully enters into the cage 16 during the record changing operation, by the arm 19, and shall not roll or slide from the cage while being turned to or from horizontal position, there is provided a gate 312 (Figs. 47, 48 and 49). It is in the form of a swinging arm provided at its upper end with a lug 313 and at its opposite end with and arcuate contact member 314 which is elongated to one side thereof and separated from the body portion by a slot 315. Extending upwardly from the lug there is a pivotally mounted roller 316 adjacent which the arm is pivoted at 317 to the side of the parallel bar 16a forming the forward edge of the cage. The rock shaft 195 has heretofore been described as oscillating the upper locking member 196 which locks the cage and magazine in alignment for record transfer.

Formed on the locking member 196 there is a camming lip 318 movable into and out of engagement with the roller 316 as the lock is actuated. The lip 318 is so positioned that when it strikes the roller 316, as shown in Figs. 47 and 48, it will swing the gate outwardly to permit a record to enter or be discharged from the cage between the upright parallel bars 16a. This occurs when the lock 196 swings to cage and magazine locking position. When it is retracted to free the cage and magazine, as shown in Fig. 28, the lip 318 disengages the roller 316 and the spring 319 acts to yieldingly move the contact member 314 across the bars for locking the record in the cage. This position is shown in Fig. 49.

The selector

For selecting one or more records for play there is provided a selector mechanism best illustrated in Figs. 14 and 15. The cam shaft 121 passes through and is rotatable in the platform 131 (reference also being made to Figs. 1, 2, 3 and 6). Secured to said platform and spaced therefrom by spacers 320 there is an annulus of insulating material 321 having mounted thereon in circular spaced arrangement a plurality of contact members 322 from which extend the soldering lugs 323. Within the annulus 321 there is a smaller annulus 324 which is attached to a collar 325 secured to the shaft 121. Attached to the inner annulus by a plurality of rivets or the like there is an annulus of electrical conducting material, the outer edge of which overlaps the inner edge of the annulus 321 (Fig. 15). Attached to the inner surface of annulus 321 there is a single conducting member 326 similar to lugs 323 arranged to always engage and provide electrical contact with the smaller inner annulus 324. Attached to the inner annulus 324 there is a lower or outer electrical contact annulus 327. This acts as a switch member and has an arm overlapping the annulus 321 so as to move between said annulus and the contacts 322 to establish contact with but one of said contacts 322 at a time. Thus, as the shaft 121 rotates the contact annulus and switch members 324, 327, a circuit is established between contact 326 and one of contacts 322. The position of shaft 121 has the effect of selecting a particular circuit.

The purpose of the above-described circuit or selecting mechanism is indicated in the wiring diagram of Fig. 50. The closing of switch 320 prepares a circuit from a secondary winding 328 to the switch member 327, and through a secondary winding 329 to one of the manually operated selector switches 330. The rotation of the switch member 327 completes the circuit when the selected contact 323 is reached. This closes the circuit through the electromagnet 134 (Fig. 19), causing the pawl 141 through the ratchet engaged thereby to arrest the segment gear 106 with the magazine at the proper position to present the selected record for transfer to the cage.

The switch operated by the coin mechanism when the machine is to be used in that capacity, or by a manually operated switch, if used without requiring a coin operation, is indicated at 331. It should be borne in mind that the operation is such that one or more records, and the particular side or sides thereof to be played may be selected, or, if no selection is made when the machine is operated, the records will be automatically played in sequence, first one side and then the other.

When no selection has been made, obviously the selecting switches 330 are not closed, but operation of the coin or manual switch 331 starts the motor 21 to drive the several cam shafts and cause rotation of the cam 48. While said cam holds the switch 320 closed, the switch 145 is closed by pressure of the contact member 119 (Fig. 21). Thus, a circuit is established through switch 320, secondary coil 328, switch 145, and electromagnet 134, resulting in the actuation of the pawl 141 to arrest and position the magazine. The switches 332 and 333 are alternately closed by the striker 148 extending from the tip of the magazine driving cam 147 (Fig. 17). Thus, the record cage is turned to present one or the other side of the record by thereby closing one or the other circuits through their respective solenoids 244 and 245 (Fig. 36). The energizing of one solenoid will throw the cage turning cam 229 to one side, while the energizing of the other solenoid will throw it to the other side.

All of the selector switches 330 are opened preparatory to making a selection by a cancelling device 334 which is a circular contact member surrounded by a ring of individual contacts, each of which is wired to the releasing magnet 335 of a selector switch 330. By closing the contact members of the cancelling device 334, a circuit is simultaneously established through the solenoids 335 of the selector switches then in closed position, releasing the catch that holds them closed. This is illustrated in Figs. 58 and 59, wherein the selector switches of Fig. 50 are indicated at 330. For each switch there is provided one of said electromagnets 335 in series therewith. A front plate 336 faces the operator through which protrude the selector buttons 337 mounted on plungers slidable through a frame 338. Each button is retained in inoperative projected position by a spring 339.

A plunger extends above an armature 340 in position to be attracted by the electromagnet, but normally maintained in spaced relation thereto by a spring 341. Near the inner end of the plunger there is provided a shoulder 342 with which the armature engages and locks when in its outer position, as shown in Fig. 58, but disengages and releases when drawn inwardly by the magnet, as shown in Fig. 59. When the button 337 is pressed inwardly by the operator, the forward end of its plunger closes the selector switch 330, and upon release by energizing the magnet 335, spring 339 retracts it so as to open the selector switch 330. Thus, the selector switch may be opened either through operating the cancelling device 334 or through the rotation of contact arm 327.

Operation

The record changer is so arranged as to be operable by depositing coins as is customary and well known in the usual coin operated phonograph. It is also operable as a non-coin operated machine, by manual operation of the switch 331.

In general, the sequence of operations may be briefly recited as follows. Upon completion of the record, the trip mechanism is actuated, whereupon (1) the tone arm is raised; (2) it is swung clear of the turntable; (3) the cage raises the record from the turntable, swinging from horizontal to vertical position in alignment with the magazine stall from which it was taken; (4) the cage and magazine are locked together in alignment at the top and bottom thereof, and the record retaining gate is opened; (5) the record is then rolled from the cage to its stall in the magazine; (6) the magazine is then unlocked and positioned to present another record to the cage, or the same record wherein its opposite side is to be played; (7) the record and cage are again locked at the top and bottom; (8) the new record is transferred from the magazine to the cage; (9) the cage is unlocked while the bottom of the magazine remains locked and the gate closes to retain the record in the cage; (10) the cage is then simultaneously turned to the horizontal position and lowered onto the turntable to deposit the record thereon in playing position, but the direction of movement in turning to the horizontal position is selectively controlled to present a selected side of the record uppermost; (11) the tone arm is then swung in position over the beginning of the record and lowered thereon for play; (12) the clutch is then operated to declutch the record changing mechanism during the playing operation; and (13) upon completion of the reproduction, the trip mechanism is actuated to throw in the clutch and start the record changing drive to start the cycle over again, as above described, and simultaneously reset the trip mechanism.

Each of the above operations may be described as follows. At the beginning of the cycle, the tripping mechanism will be as shown in Figs. 9 and 10, the end of the record having been reached. Arms 55 and 61 are lowered, consequently throwing in the clutch 61 (Fig. 7) to drive the record changing cam shafts. A pattern may have operated one or more of the selective switches 330 and closed the switch 331 manually or by coin, thus starting the motor 21.

The tone arm is elevated and swung clear of the turntable, as shown in Figs. 40 to 46, inclusive. Cam 50 presses upwardly on pin 254 which in turn raises the tone arm through its bridge 264. Thereupon cam 51 pulls the arm 274 which turns sleeve 249, which is keyed to the turret 255 upon which the tone arm is pivoted at 262.

The cage is raised from playing position to the vertical record transferring position, as shown in Figs. 32, 33 by the cam 52. In this position, it is centered by roller 220 engaging the recess 228, as shown in Figs. 34, 39.

The cage and magazine are then locked together against relative movement, both at the top (Fig. 26) and at the bottom (Fig. 30) through the action of the cams 172 and 46, respectively. Simultaneously therewith the record is freed from the cage by movement of the gate from closed position to open position (Figs. 48, 49).

The record is then rolled from the cage by the arm 20, as shown in Fig. 1, moving from the position shown in Fig. 3 to that shown in Fig. 25. It engages the edge of the record and rolls it into its proper stall in the magazine. Thereupon the magazine is unlocked from the cage through the action of cams 46 and 172. The locking member 196 at the top of the magazine is moved to the position shown in Fig. 28 and the locking member 202 at the bottom of the magazine is moved to the position shown in Fig. 31. While the cage is still locked in this position, the magazine is free to move and select another record.

The next record to be played is selected by repositioning the magazine to align such record with the cage. Or if the other side of the record just played is to be reproduced, then the magazine will move through its cycle, returning the same record into aligned position.

The magazine positioning cam 147 (Figs. 17, 18) is rotated to a predetermined position for this purpose by the cam 47 operating the actuator 97 in the manner shown and described in respect to Figs. 13 and 17 to 22, inclusive. The selector switch 330 having been closed, the solenoid 134 (Fig. 21) will be energized to arrest the cam and position the magazine upon rotation of cam shaft 121 to a predetermined position. This position is determined by the corresponding positioning of the arm 237 (Figs. 15, 50). This position, as above mentioned, is selected by the closing of one of the plurality of circuits leading to contacts 323 by the selector switch 330. In this connection, it may be noted, by reference to Figs. 17, 18, that the actuator 97 is moved its full distance by cam 47 to move the segment gear 103 to rotate the cam 147 through the spring 109. Thus, the segment gear and cam 147 may be arrested at a selected position, while the actuator continues to move.

After the segment gear has moved the magazine positioning cam to its selected position, it is returned to its initial position by the springs 98 and 109, since the ratchet 122 and cam driving pinion 120 are free to rotate in the reverse direction (Figs. 15, 19). Thus, it will be seen that the cam 147 will have moved the magazine through the roller 299 (Figs. 17, 57) to the extent corresponding with the angular distance lying between the contacts 323 surrounding said shaft 121. Said contacts are angularly spaced to correspond with the linear spacing of the record stalls in the magazine (Figs. 14, 15).

For the purpose of enabling one side or the other of a record to be reproduced, or effect reversing of the record for playing opposite sides, the switches 332 and 333 (Figs. 17, 50) are positioned to be engaged by the striker 148. Said switches energize the respective solenoids 247, 245 (Figs. 4, 36). This determines the side of the record to be positioned for play, as described in connection with Figs. 32 to 37, inclusive. In the movement of the magazine positioning cam 147, it will have caused one or the other of solenoids 244, 245 to be energized.

The contacts 323 are so arranged that those on one side of the circle will cause the respective records to be played on the sides facing in the same direction in the magazine. Those on the other side of the circle correspond to the same records, but cause the opposite faces thereof to be positioned for playing. Therefore, the particular face of a selected record to be reproduced is determined by the side of the circle surrounding shaft 121 upon which its corresponding contacts are positioned, and during rotation of the shaft to bring the contact arm 327 into engagement with such contact, the striker 148 will have actuated the proper switch 332, 333 to so position the record on the turntable.

If no selector switch is closed by the operator, then the records will be played in sequence. The corresponding sides of each record will be played during the travel of the striker 148 from one of said switches 332, 333 to the other. But after having struck one of said switches, then the reverse sides of said records will be played in sequence. Since no selector switch has been closed, none of the contacts 323 are effected to close a selective circuit. Consequently, the magnet 134 is not energized by the selectors to control the position of the magazine positioning cam. However, said solenoid 134 is energized through the closing of switch 145 (Figs. 17, 21) which is in parallel with the selector switches 323, 327. Switch 145 is, therefore, closed to actuate the solenoid 134 upon the actuator 97 having moved to its extreme position, and having swung the segment gear 103 (Fig. 17) as far as it will go. But said segment gear is arranged to revolve the magazine positioning cam 147 one position or station less than the number of stations on its periphery.

As shown herein, the machine is designed to play 40 compositions on 20 records. Therefore, cam 147 is designed to move through 20 stations during a half revolution and the same 20 stations, but with the record sides reversed, during the other half revolution, or 40 in all. Thus, the segment gear 103 is designed to rotate the cam 39/40ths of a revolution at each full stroke. This results in the magazine being moved from its then 10 location to one end of its movement, thence to the other end of its movement, and back again to one station removed from its former station. In revolving 340 degrees (39/40ths), the striker 148 will close only one of the switches 332, 333 when it starts from a position just beyond either switch, since the other switch will lie in that half of the circle not included. Hence, there will be a record reversal through actuation of the cam 229. On succeeding revolutions, said striker will close both switches, throwing said cam first one way, then the other, but with no change in its position or its effect on record reversal. Not until the opposite switch lies in the unplayed half of the circle will said cam again be moved but once and thereby effect a reversal of the record.

The magazine having been thus positioned to present the next selected record or the next record in sequence to the cage, the magazine and cage are again locked, as shown in Figs. 26 and 30, and the record transfer arm 19 is moved from the position shown in Fig. 23 to that shown in Fig. 24, to roll the record into the cage. This is followed by a movement of the gate 314 from its open position, shown in Fig. 48, to its closed position shown in Fig. 49, so that the record is locked in the cage.

The cage is then lowered and turned from vertical to horizontal position by the cam 52 moving from the position shown in Fig. 32 to that shown in Fig. 33. During this movement the cam 229 (Fig. 36) has been shifted in the manner above described to turn the magazine to one or the other of its horizontal positions. The record is then centered upon the turntable with the cage still surrounding it, but sufficiently lowered to have disengaged the periphery of the record so that it will freely revolve during the playing operation.

The tone arm is then swung to position over the beginning of the record by the cam 51 (Figs. 43-46) assisted by the presser 279, its position being controlled by the first step 280 in the profile of the cam. The stylus is then lowered into engagement with the record upon the follower 271 dropping into the recess 272 in cam 50 (Fig. 41). This movement is cushioned by the spring pressed member 266. Upon such engagement with the record, cam 51 will have moved to the position shown in Fig. 44, wherein the recess of cam 51 is sufficiently deep to permit free movement of the follower 277, while the tone arm moves inwardly toward the center of the record.

During the inward movement of the reproducer, the trip pawl rides over the ratchet teeth 285 (Fig. 12) to engage the head 290 or lock in the ratchet teeth to actuate the trip and place the record changing mechanism into operation upon completion of reproduction.

The cycle of operation has been completed and the machine will either come to rest with the circuit broken at 131, or the next cycle will begin its operation.

The invention claimed is:

1. In a record changing mechanism for automatic phonographs, a record transfer carrier comprising a semi-circular portion formed to receive the edge of a vertically disposed record therein, said portion terminating in a pair of parallel spaced arms extending horizontally when in record receiving position, and a pair of upright bars extending between and secured to the free ends of said arms, said bars being spaced substantially the thickness of a record to permit a record to pass on edge therebetween into said semi-circular portion to be retained therein.

2. In a record changing mechanism for automatic phonographs, a record transfer carrier comprising a semi-circular portion formed to receive the edge of a vertically disposed record therein, said portion terminating in a pair of spaced parallel arms extending horizontally when in record receiving position, a pair of parallel upright bars extending between and secured to the ends of said arms, said bars being so spaced as to permit a record to pass on edge therebetween into said semi-circular portion, and a pair of locking ears secured to and extending outwardly from the upper and lower ends of said bars.

3. In a record changing mechanism for automatic phonographs having a turntable for receiving a record transferred thereto, a record transfer carrier comprising a rigid semi-circular portion internally formed with a channel to receive and embrace the edge of a record, said portion terminating in a pair of outwardly extending spaced arms correspondingly formed, the inner periphery of said semi-circular portion and arms being of less diameter than the record, and the record receiving channel thereof being of a width greater than the thickness of the record, whereby said record may be rotated by the turntable freely within the channel of said carrier.

4. In an automatic phonograph having a turntable, a record receiving carrier operable to place a record on the turntable, a magazine movably mounted adjacent said carrier for containing a plurality of records to be reproduced, means operable to cause relative movement between said magazine and carrier to present one of the records carried by said magazine to said carrier, means adapted to transfer said record therebetween, projections on said magazine and carrier extending in alignment when in record transfer position, a movable latch mounted adjacent thereto, and means actuated in timed relation with said record transfer means adapted to move said latch into engagement with said projections to lock said magazine and carrier in alignment during the record transfer operation.

5. In an automatic phonograph having a turntable, a record receiving carrier operable to place a record on the turntable, a magazine movably mounted adjacent said carrier for containing a plurality of records to be reproduced, means operable to cause relative movement between said magazine and carrier to present one of the records carried by said magazine to said carrier, means adapted to transfer said record therebetween, projections ertending from the top and bottom of said magazine and carrier, the upper and lower projections being aligned respectively when said magazine and carrier are in record transfer relation, a lower locking element and an upper locking element, and means operable to move said elements into engagement with the respective lower and upper projections in timed relation with said record transfer means, whereby relative movement between said carrier and magazine will be prevented during the record transfer operation.

6. In an automatic phonograph having a turntable, a record receiving carrier operable to place a record on the turntable, a magazine movably mounted adjacent said carrier for containing a plurality of records to be reproduced, means operable to cause relative movement between said magazine and carrier to present one of the records carried by said magazine to said carrier, means adapted to transfer said record therebetween, a pair of spaced ears extending from the forward upper edge of said carrier, a series of spaced projections on the forward upper edge of said magazine, a pair of said projections registering with said ears when said magazine and carrier are in record transfer position, a swinging latch mounted to swing to and from locking engagement between said ears and projections, and means adapted to swing said latch in timed relation with the operation of the record transfer means.

7. In an automatic phonograph, having a turntable, a record receiving carrier operable to place a record on the turntable, a magazine movably mounted adjacent said carrier for containing a plurality of records to be reproduced, means operable to cause relative movement between said magazine and carrier to present one of the records carried by said magazine to said carrier, means adapted to transfer said record therebetween, a pair of spaced ears extending from the forward upper edge of said carrier, a series of spaced projections on the forward upper edge of said magazine, a pair of said projections registering with said ears when said magazine and carrier are in record transfer position, a swinging latch mounted to swing to and from locking engagement between said ears and projections, corresponding ears and projections upon the lower side of said carrier and magazine, a corresponding swinging latch for locking engagement therewith, and means for operating said latches in timed relation with each other and said record transfer means, whereby relative movement between said carrier and magazine during the record transfer operation will be prevented.

8. In an automatic phonograph having a turntable, a record receiving carrier operable to place a record on the turntable, said carrier having a record embracing and supporting portion, means for transferring records to and from said carrier, a gate movably mounted upon said carrier, and mechanism controlled by said record transfer means operable to move said gate to and from position for retaining the record in the embracing and supporting portion of said carrier while being placed on said turntable.

9. In an automatic phonograph having a horizontally disposed turntable, a record receiving carrier provided with channels for embracing the edge of a record received therein, means operable to move said carrier from a vertical record receiving position to a position embracing said turntable to place the record thereon for free rotation, means for transferring said record to and from said carrier, and means carried by said carrier normally in position to lock the record in said record embracing channels and engageable by said transfer means to free said record for the transfer thereof.

10. In an automatic phonograph having a turntable and reproducer, a record receiving carrier provided with channels for embracing the edge of a record received therein, means for operating said carrier to place the record on the turntable for free rotation thereby in engagement by said reproducer, means adapted to transfer said record to and from said carrier, a gate pivotally mounted on said carrier, a spring adapted to normally maintain said gate in position on said carrier to enclose a record within said embracing channels, and means operable by said transfer means to swing said gate to open position for freeing said record during the record transfer operation.

11. In an automatic phonograph having a turntable, a record magazine for containing a plurality of records supported upon edge in parallel spaced relation, a rotating cam, means actuated by said cam for imparting linear motion to said magazine for reciprocating it relative to said turntable, means for rotating said cam, an electrically actuated latch adapted to arrest the rotary movement of said cam, and remotely actuated means operable to close an electric circuit through said electrically actuated latch upon said magazine reaching a predetermined position.

12. In an automatic phonograph having a turntable, a record magazine for containing a plurality of records supported upon edge in parallel spaced relation, a record receiving carrier operable to place a record on the turntable, means for transferring records between said magazine and carrier, a rotatable cam, means actuated by said cam adapted to impart linear movement to said magazine, means for rotating said cam, a latch operable to arrest the movement of said cam, a solenoid for actuating said latch, a rotary switch rotatable with said cam, and a selector switch operable to close the circuit through said solenoid upon said rotary switch and magazine reaching a predetermined position for presenting a selected record to said carrier.

13. In an automatic phonograph having a horizontally disposed turntable and a reproducer, a record receiving carrier operable to place a record on the turntable for engagement by said reproducer, a carriage mounted to pivotally support said carrier above said turntable, record transfer mechanism operable to transfer records to and from said carrier when in a vertical position, carriage moving mechanism adapted to lower said carriage and carrier towards said turntable for depositing its record thereon, a cam engageable by said carrier during its lowering movement adapted to turn it from a vertical to a horizontal position, said cam being movable in one direction for turning said carrier to present one side of the record to the reproducer and in the other direction to present the other side of the record thereto, a solenoid operable when energized to move said cam in one direction, a second solenoid operable when energized to move said cam in the other direction, and a control switch for selectively energizing the respective solenoids.

14. In an automatic phonograph having a turntable and reproducer, a record receiving carrier operable to place a record on the turntable for engagement by said reproducer, a magazine for said records, a rotatable member having oppositely disposed and corresponding cam surfaces, each cam surface acting to move the magazine to corresponding positions with respect to said carrier, record transfer mechanism adapted to transfer records between said magazine and carrier, carrier turning mechanism operable to turn said carrier to one side or the other for presenting corresponding sides of the record to said reproducer, electrically actuated means adapted to control said carrier turning mechanism, and a switch member engageable by said rotatable member during its movement adapted to control said electrically actuated means to cause said carrier to present one side of the record to the reproducer during the operation of one of said cam surfaces and the other side thereof during the operation of the opposite cam surface.

15. In an automatic phonograph having a turntable and reproducer, a record receiving carrier operable to place a record on the turntable for engagement by said reproducer, a magazine for said records, a rotatable member having oppositely disposed and corresponding cam surfaces, each cam surface acting to move the magazine to corresponding positions with respect to said carrier, record transfer mechanism adapted to transfer records between said magazine and carrier, carrier turning mechanism operable to turn said carrier to one side or the other to present corresponding sides of the record to said reproducer, electrically actuated means adapted to control said record turning mechanism, a switch member actuated by said rotatable member during its movement adapted to control said electrically actuated means to present one side of the record to the reproducer during the operation of one of its cam surfaces and the other side thereof during the operation of its opposite cam surface, and selector members operable to control the extent of rotation of said rotatable member, and turn said carrier to present a selected side of a selected record to said reproducer.

16. In an automatic phonograph having a turntable and reproducer, a record receiving carrier operable to place a record on the turntable for engagement by said reproducer, a magazine for containing a plurality of records movable with respect to said carrier for presenting a selected record thereto, a rotary member operably connected with said carrier to impart lineal motion thereto, said member having oppositely disposed and corresponding cam surfaces each of which is adapted to move the magazine to corresponding positions with respect to said carrier, a rotary switch rotatable with said member and having a series of contacts for closing a circuit to selectively position the magazine for the transfer of a selected record, means actuated by the closing of said circuit to arrest the movement of said rotary member, and selective mechanism actuated by the movement of said rotary member in positioning the magazine, said selective mechanism being operably associated with said carrier for moving it to present one or the other side of said record corresponding to the effectual cam surface.

17. In an automatic phonograph having a turntable and a reproducer, a record receiving carrier operable to place a record on the turntable for engagement by said reproducer, a magazine for containing a plurality of records movable with respect to said carrier for presenting a selected record thereto, a rotary member operably connected with said carrier to impart lineal motion thereto, said member having oppositely disposed and corresponding cam surfaces each of which is adapted to correspondingly position said magazine, a rotary switch rotatable with said member and having a series of contacts for closing a circuit to selectively position the magazine for the transfer of a selected record, mechanism actuated by the closing of said circuit operable to arrest the movement of said rotary member, and solenoid actuated means operably associated with said carrier to turn it for presenting one or the other side of its record to said reproducer, said means being controlled by the rotation of said member in rendering one or the other of its cam surfaces effective in the positioning of the magazine.

18. In an automatic phonograph having a turntable and reproducer, means operable to place a record on the turntable for engagement by said reproducer, a record magazine adapted to present a selected record to said means, said magazine being movable relative thereto, a carriage for supporting and moving said magazine, a series of rollers adapted to movably support said carriage upon a supporting base, guide members on said base engageable by said rollers for guiding the movement of said carriage, a centrally disposed actuating roller connected with said carriage and extending through said base, a grooved cam into which said roller extends, and means operable to rotate said cam for imparting to said carriage and magazine linear movement, whereby it will be positioned to present one of its records to said record placing means.

19. In an automatic phonograph having a turntable and reproducer, means operable to place a record on the turntable for engagement by said reproducer, a record magazine adapted to present a selected record to said means, said magazine being movable relative thereto, a carriage for supporting and moving said magazine, a series of rollers dapted to movably support said carriage upon a supporting base, guide members on said base engageable by said rollers for guiding the movement of said carriage, a centrally disposed actuating roller connected with said carriage and extending through said base, a grooved cam into which said roller extends, and means operable to rotate said cam for imparting to said carriage and magazine linear movement to present one of its records to said record placing means, said rotatable cam having two oppositely disposed and corresponding cam surfaces, said cam surfaces being so arranged that said magazine will be moved through corresponding cycles of movements by each cam surface.

20. In an automatic phonograph having a turntable and reproducer, means operable to place a record on the turntable for engagement by said reproducer, a record magazine adapted to present a selected record to said means, said magazine being movable relative thereto, a carriage for supporting and moving said magazine, a series of rollers positioned to movably support said carriage upon a supporting base, guide members on said base engageable by said rollers for guiding the movement of said carriage, a centrally disposed actuating roller connected with said carriage and extending through said base, a grooved cam into which said roller extends, means operable to rotate said cam for imparting to said carriage and magazine linear movement to present one of its records to said record placing means, said cam having two oppositely disposed and corresponding cam surfaces, said cam surfaces being so arranged that said magazine will be moved through corresponding cycles of movements by each cam surface, and mechanism controlled by said cam operable to turn said record placing means to place a record presented thereto by said magazine on said turntable with one side thereof uppermost when one cam surface is effective and the other side uppermost when the other side of said cam surface is effective.

21. In an automatic phonograph having a horizontally disposed turntable, a movable carriage having one end pivotally mounted adjacent the turntable and the other end movable in a vertical plane centrally of said turntable, a record carrier pivotally mounted on said carriage movable about its pivotal mounting from a vertical record receiving position to a horizontal record depositing position, carriage moving mechanism operable to swing said carriage about its pivotal mounting for lowering and raising said carrier relative to the turntable, an adjustable cam member mounted in the path of said carriage when lowered towards said turntable, a cam follower on said carrier engageable with said cam member in the downward movement of said carriage, said follower upon engagement with said cam member being adapted to turn said carrier upon its pivotal mounting from a vertical to a horizontal position, and a selectively actuated cam operating mechcanism adapted to adjust said cam between two operating positions in one of which said cam is placed to move said follower in one direction and in the other of which said cam is placed to move said follower in the reverse direction, whereby said carrier may be turned in either direction to place the record on the turntable with a selected side uppermost.

22. In an automatic phonograph having a horizontally disposed turntable, a movable carriage, a record carrier pivotally mounted on said carriage movable about its pivotal mounting from a vertical record receiving position to a horizontal record depositing position, carriage moving mechanism operable to lower said carriage and carrier to place said record on said turntable, a shiftable cam member, a cam follower operatively connected to said carrier and engageable with said cam member in the downward movement of said carriage, said follower when so engaged turning said carrier on its pivotal mounting, and a pair of solenoids, one connected to each side of said shiftable cam member adapted to be selectively energized to shift said member between two operating positions in one of which said cam is placed to move said follower in one direction and in the other of which said cam is placed to move said follower in the reverse direction, whereby said carrier may be selectively turned in either direction to place the record on the turntable with the selected side uppermost.

23. In an automatic phonograph having sound reproducing instrumentalities, a movable magazine for carrying a plurality of double-faced records to be reproduced, a movable carrier adapted to receive a record from said magazine, a rotary member having oppositely disposed cams, each of said cams being operably associated with said magazine to correspondingly position it for presenting the same record to said carrier, driving means for said member, control mechanism actuated by said member upon being rotated from the effective position of one of said cams to the effective position of the other cam, and means controlled by said mechanism extending into the path of movement of said carrier operable upon engagement thereby to cause said carrier to present one or the other side of the record to said instrumentalities according to the cam rendered effective.

24. In an automatic phonograph, a turntable, a record carrier adapted to place a record on said turntable with one or the other side in position for play, a magazine for containing a plurality of records movable to present one of said records to said carrier, a rotary member having oppositely disposed corresponding cam surfaces adapted to be operably connected with said magazine, mechanism for rotating said member to render one or the other of its cam surfaces effective for positioning said magazine relative to said carrier with one of its records presented for transfer thereto, and carrier control mechanism operable by said member upon one or the other cam surfaces becoming effective, said mechanism being operably associated with said carrier for affecting its movement to determine the side of the presented record to be positioned for play.

25. In an automatic phonograph having a turntable, a record magazine for containing a plurality of records, a record transfer mechanism operable to transfer a record from the magazine for placement on said turntable, a rotatable cam operably connected with said magazine adapted to move it to a selected position for presenting a selected record to said transfer mechanism, means for rotating said cam, a latching element rotatable with said cam, a latch movable into latching engagement with said element for arresting the movement of said magazine, said latch being normally withheld from latching engagement, and remotely controlled mechanism operable to release said latch upon the magazine being moved to a selected record presenting position.

26. In an automatic phonograph having a turntable and reproducer, a record transfer member mounted adjacent thereto and operable to place a record on the turntable for engagement by said reproducer, a record magazine for containing a plurality of records supported adjacent said turntable and member and movable relative thereto to present one of said records for transfer, a rotatable grooved cam having two oppositely-disposed and corresponding cam surfaces, a cam follower on said magazine extending into the groove of said cam, and driving mechanism operable to rotate said cam to predetermined selected positions for imparting linear movement to said magazine to present one of its records to said transfer member, said corresponding cam surfaces being so arranged that said magazine will be moved through corresponding cycles of movement by each cam surface.

27. In an automatic phonograph having a turntable and reproducer, a record transfer member operable to receive and place a record on the turntable and remove it therefrom, a magazine for containing a plurality of records to be reproduced, a pivotally mounted record transfer arm associated with said magazine having its free end movable to engage and move a record from the magazine to said transfer member, a pivotally mounted record transfer arm associated with said transfer member having its free end movable to engage and return said record from said member to the magazine, an operating cam, means for actuating said cam magazine and transfer member in timed relation, chain driven sprockets rotatably mounted and connected with each of said arms respectively, a support for said sprockets and arms, one end of each of the driving chains being resiliently connected to said mounting, and levers pivoted upon said mounting yieldingly connected with the other ends of said chains respectively, said levers being positioned for engagement by said cam, said cam being so formed that said first mentioned arm will be thereby moved to yieldingly transfer a record from the magazine to said member, and the second-mentioned arm thereby moved to yieldingly return the record from said member to the magazine.

28. In an automatic phonograph having sound reproducing instrumentalities, a movable magazine for carrying a plurality of double faced records to be reproduced, a movable carrier adapted to receive a record from said magazine and place it for reproduction, a rotary member having oppositely disposed cam surfaces, each of said cam surfaces being operably associated with said magazine correspondingly positioning it for presenting the same record to said carrier, driving means operably connected with said member for rotating the same, an operating element on said member intermediate said cam surfaces, control mechanism actuated by said element upon said member being rotated from the effective position of one of said cam surfaces to the effective position of the other cam surface, and means controlled by said mechanism operably associated with said carrier to affect its movement during placement of a record to present one or the other side thereof to said instrumentalities according to the cam surface rendered effective.

FRED H. OSBORNE.
CHARLES J. HULL.